(12) United States Patent
Vanderhook et al.

(10) Patent No.: US 9,619,815 B2
(45) Date of Patent: Apr. 11, 2017

(54) SYSTEM AND METHOD OF DETERMINING USER DEMOGRAPHIC PROFILES

(71) Applicant: Viant Technology LLC, New York, NY (US)

(72) Inventors: Timothy C. Vanderhook, Newport Beach, CA (US); Christopher J. Vanderhook, Yorba Linda, CA (US); Adityavijay B. Rathore, Ahmedabad (IN); Manish H. Patil, Ahmedabad (IN); Nagendra M. N. Sastry, Ahmedabad (IN); Raviratan Arora, Jersey City, NJ (US); Shanubhog G. Sangameswara, Cupertino, CA (US)

(73) Assignee: Viant Technology LLC, New York, NY (US)

( * ) Notice: Subject to any disclaimer, the term of this patent is extended or adjusted under 35 U.S.C. 154(b) by 265 days.

(21) Appl. No.: 14/298,782

(22) Filed: Jun. 6, 2014

(65) Prior Publication Data
US 2014/0289018 A1      Sep. 25, 2014

Related U.S. Application Data

(60) Division of application No. 13/633,759, filed on Oct. 2, 2012, now abandoned, which is a continuation of application No. 12/709,401, filed on Feb. 19, 2010, now Pat. No. 8,281,005, which is a continuation of application No. 11/852,775, filed on Sep. 10, 2007, now Pat. No. 7,698,422.

(51) Int. Cl.
*G06F 15/16*     (2006.01)
*G06Q 30/02*    (2012.01)
*H04L 29/08*    (2006.01)
*G06F 12/00*    (2006.01)

(52) U.S. Cl.
CPC ......... *G06Q 30/0204* (2013.01); *G06Q 30/02* (2013.01); *H04L 29/08072* (2013.01)

(58) Field of Classification Search
USPC ............................... 709/203, 223–229, 250
See application file for complete search history.

(56) References Cited

U.S. PATENT DOCUMENTS

| | | |
|---|---|---|
| 5,754,939 A | 5/1998 | Herz et al. |
| 5,761,662 A | 6/1998 | Dasan |

(Continued)

OTHER PUBLICATIONS

Amati, "Probabilistic Learning for Selective Dissemination of Information," Information Processing & Management 35, pp. 633-654, 1999.

(Continued)

*Primary Examiner* — Zarni Maung
(74) *Attorney, Agent, or Firm* — Gates & Cooper LLP

(57) ABSTRACT

A method determines a user demographic profile of a user that visits one or more websites of a predetermined group of websites. The method includes generating a first record of visits by the user to the websites of the predetermined group of websites. The method further includes providing one or more website profiles comprising demographic characteristics of each website visited by the user of the predetermined group of websites. The method further includes calculating an estimated user demographic profile of the user by using the first record of visits by the user and the one or more website profiles.

21 Claims, 29 Drawing Sheets

(56) References Cited

U.S. PATENT DOCUMENTS

| | | | |
|---|---|---|---|
| 5,907,836 | A | 5/1999 | Sumita et al. |
| 5,978,799 | A | 11/1999 | Hirsch |
| 6,006,218 | A | 12/1999 | Breese et al. |
| 6,029,195 | A | 2/2000 | Herz |
| 6,044,376 | A | 3/2000 | Kurtzman, II |
| 6,081,750 | A | 6/2000 | Hoffberg et al. |
| 6,098,065 | A | 8/2000 | Skillen et al. |
| 6,199,067 | B1 | 3/2001 | Geller |
| 6,256,633 | B1 | 7/2001 | Dharap |
| 6,266,668 | B1 | 7/2001 | Vanderveldt et al. |
| 6,292,796 | B1 | 9/2001 | Drucker et al. |
| 6,351,745 | B1 | 2/2002 | Itakura et al. |
| 6,374,237 | B1 | 4/2002 | Reese |
| 6,377,949 | B1 | 4/2002 | Gilmour |
| 6,385,619 | B1 | 5/2002 | Eichstaedt et al. |
| 6,463,533 | B1 | 10/2002 | Calamera et al. |
| 6,487,538 | B1 | 11/2002 | Gupta et al. |
| 6,496,931 | B1 | 12/2002 | Rajchel et al. |
| 6,654,735 | B1 | 11/2003 | Eichstaedt et al. |
| 6,751,606 | B1 | 6/2004 | Fries et al. |
| 6,839,680 | B1 | 1/2005 | Liu et al. |
| 7,191,409 | B2 | 3/2007 | Petersen |
| 7,213,032 | B2 | 5/2007 | Mascarenhas |
| 7,451,233 | B2 | 11/2008 | Parekh et al. |
| 7,596,506 | B2 | 9/2009 | Shapira et al. |
| 7,644,056 | B2 | 1/2010 | Khalsa |
| 7,698,422 | B2 | 4/2010 | Vanderhook et al. |
| 8,281,005 | B2 * | 10/2012 | Vanderhook ....... G06Q 30/0204 709/224 |
| 2002/0022993 | A1 | 2/2002 | Miller et al. |
| 2002/0049848 | A1 | 4/2002 | Lin et al. |
| 2002/0099824 | A1 | 7/2002 | Bender et al. |
| 2003/0115023 | A1 * | 6/2003 | Nickerson ........... G06F 3/04847 702/188 |
| 2004/0205157 | A1 | 10/2004 | Bibelnieks et al. |
| 2005/0210102 | A1 | 9/2005 | Johnson et al. |
| 2006/0026067 | A1 | 2/2006 | Nicholas et al. |
| 2006/0123105 | A1 | 6/2006 | Parekh et al. |
| 2006/0248188 | A1 * | 11/2006 | Nickerson ......... G06F 17/30896 709/224 |
| 2006/0271669 | A1 | 11/2006 | Bouguenon et al. |
| 2007/0067297 | A1 | 3/2007 | Kublickis |
| 2007/0180469 | A1 | 8/2007 | Finley et al. |
| 2007/0214037 | A1 | 9/2007 | Shubert et al. |
| 2007/0282681 | A1 | 12/2007 | Shubert et al. |
| 2008/0033794 | A1 | 2/2008 | Ou et al. |
| 2008/0188958 | A1 | 8/2008 | Herbst |
| 2008/0263048 | A1 | 10/2008 | Wise |
| 2009/0055485 | A1 | 2/2009 | Tsai et al. |
| 2009/0083125 | A1 * | 3/2009 | Yasnoff .................. G06Q 30/02 705/14.17 |
| 2009/0083264 | A1 * | 3/2009 | Nickerson .............. G06Q 30/02 |
| 2009/0099914 | A1 * | 4/2009 | Lang ................. G06Q 30/0224 705/14.25 |
| 2015/0242492 | A1 * | 8/2015 | Bhatt ................ G06F 17/30604 707/748 |

OTHER PUBLICATIONS

Arezki, "PAWebSearch: An Intelligent Agent for Web Information Retrieval," AISTA 2004 in Cooperation with the IEEE Computer Society Proceedings/ISBN, Nov. 15-18, Kirchberg—Luxembourg.

Bauer, "Exploiting information access patterns for context-based retrieval," International Conference on Intelligent User Interfaces, Proceedings of the 7.sup.th international conference on Intelligent user interfaces, San Francisco, CA, pp. 176-177, 2002.

Billsus, D., et al., "Revising User Profiles: The Search for Interesting Web Sites", Department of Information and Computer Science, University of California, Irvine.

Bloedorn, "Machine Learning of User Profiles: Representational Issues," Proceedings of AAAI-96, Portland, OR, Aug. 4-8, 1996, pp. 433-438.

Bordogna, "Controlling Retrieval Through a User-Adaptive Representation of Documents," International Journal of Approximate Reasoning, vol. 12, pp. 317-339, 1995.

Cheung, "Discovering User Access Patterns on the World Wide Web," Knowledge-Based Systems 10, pp. 463-470, 1998.

Danilowicz, "Model of User Profiles and Personalization for Web-Based Information Retrieval System," Knowledge-Based Information Retrieval and Filtering from the Web (Kluwer Academic Publishers), 6: pp. 121-136, 2003.

Danilowicz, "Modelling of User Preferences and Needs in Boolean Retrieval Systems," Information Processing & Management, vol. 30, No. 3, pp. 363-378, 1994.

Danilowicz, "Relative Indexing on the Basis of Users' Profiles," Information Processing & Management, vol. 19, No. 3, pp. 159-163, 1983.

Gauch, S., et al., "Ontology Based Personalized Search".

Jeevan, "A Selective Review of Research in Content Personalization," Emerald Library Review, vol. 55, No. 9, pp. 556-586, 2006.

Laine-Cruzel, "Improving Information Retrieval by Combining User Profile and Document Segmentation," Information Processing & Management, vol. 32, No. 3, pp. 305-315, 1996.

Myaeng, "Integration of User Profiles: Models and Experiments in Information Retrieval," Information Processing & Management, vol. 26, No. 6, pp. 719-738, 1990.

Montebello, "Information Overload—An IR problem?" IEEE, 1998.

Newell, "User Models and Filtering Agents for Improved Internet Information Retrieval," User Modeling and User-Adapted Interaction (Kluwer Academic Publishers) 7:223-237, 1997.

Quiroga, "An experiment in Building Profiles in Information Filtering: The Role of Context of User Relevance Feedback," Information Processing and Management 38, pp. 671-694, 2002.

Sieg, "Inferring User's Information Context: Integrating User Profiles and Concept Hierarchies," DePaul University, School of Computer Science, Telecommunication and Information Systems, 2004.

Xu, "Hierarchical Content Description and Object Formation by Learning," Epartment of Electrical and Computer Engineering, University of Rochester, Rochester, NY, IEEE, 1999.

Yochum, "Research in Automatic Profile Generation and Passage-Level Routing with LMDS," The Fourth Text Retrieval Conference TREC-4, pp. 153-191, pp. 500-236, 1996.

* cited by examiner

| Step | Dir1 | InputFile1 | Dir2 | InputFile2 | Dir3 | OutputFile |
|---|---|---|---|---|---|---|
| 1 | A | File01.001 | B | File01.023 | C | File02.001 |
| 2 | A | File01.002 | B | File01.024 | C | File02.002 |
| 3 | A | File01.003 | B | File01.025 | C | File02.003 |
| 4 | A | File01.004 | B | File01.026 | C | File02.004 |
| 5 | A | File01.005 | B | File01.027 | C | File02.005 |
| 6 | A | File01.006 | B | File01.028 | C | File02.006 |
| 7 | A | File01.007 | B | File01.029 | C | File02.007 |
| 8 | A | File01.008 | B | File01.030 | C | File02.008 |
| 9 | A | File01.009 | B | File01.031 | C | File02.009 |
| 10 | A | File01.010 | B | File01.032 | C | File02.010 |
| 11 | A | File01.011 | B | File01.033 | C | File02.011 |
| 12 | A | File01.012 | B | File01.044 | C | File02.012 |
| 13 | A | File01.013 | C | File01.045 | B | File02.013 |
| 14 | A | File01.014 | C | File01.046 | B | File02.014 |
| 15 | A | File01.015 | C | File01.047 | B | File02.015 |
| 16 | A | File01.016 | C | File01.048 | B | File02.016 |
| 17 | A | File01.017 | C | File01.049 | B | File02.017 |
| 18 | A | File01.018 | C | File01.050 | B | File02.018 |
| 19 | A | File01.019 | C | File01.051 | B | File02.019 |
| 20 | A | File01.020 | C | File01.052 | B | File02.020 |
| 21 | A | File01.021 | C | File01.053 | B | File02.021 |
| 22 | A | File01.022 | C | File01.054 | B | File02.022 |
| 23 | B | File01.034 | C | File01.055 | A | File02.023 |
| 24 | B | File01.035 | C | File01.056 | A | File02.024 |
| 25 | B | File01.036 | C | File01.057 | A | File02.025 |
| 26 | B | File01.037 | C | File01.058 | A | File02.026 |
| 27 | B | File01.038 | C | File01.059 | A | File02.027 |
| 28 | B | File01.039 | C | File01.060 | A | File02.028 |
| 29 | B | File01.040 | C | File01.061 | A | File02.029 |
| 30 | B | File01.041 | C | File01.062 | A | File02.030 |
| 31 | B | File01.042 | C | File01.063 | A | File02.031 |
| 32 | B | File01.043 | C | File01.064 | A | File02.032 |
| 33 | A | File02.023 | B | File02.012 | C | File03.001 |
| 34 | A | File02.024 | B | File02.013 | C | File03.002 |
| 35 | A | File02.025 | B | File02.014 | C | File03.003 |
| 36 | A | File02.026 | B | File02.015 | C | File03.004 |
| 37 | A | File02.027 | B | File02.016 | C | File03.005 |
| 38 | A | File02.028 | C | File02.001 | B | File03.006 |
| 39 | A | File02.029 | C | File02.002 | B | File03.007 |
| 40 | A | File02.030 | C | File02.003 | B | File03.008 |
| 41 | A | File02.031 | C | File02.004 | B | File03.009 |
| 42 | A | File02.032 | C | File02.005 | B | File03.010 |
| 43 | B | File02.017 | C | File02.006 | A | File03.011 |
| 44 | B | File02.018 | C | File02.007 | A | File03.012 |
| 45 | B | File02.019 | C | File02.008 | A | File03.013 |
| 46 | B | File02.020 | C | File02.009 | A | File03.014 |
| 47 | B | File02.021 | C | File02.010 | A | File03.015 |
| 48 | B | File02.022 | B | File02.011 | A | File03.016 |
| 49 | A | File03.011 | B | File03.006 | C | File04.001 |
| 50 | A | File03.012 | B | File03.007 | C | File04.002 |
| 51 | A | File03.013 | B | File03.008 | C | File04.003 |
| 52 | A | File03.014 | C | File03.001 | B | File04.004 |
| 53 | A | File03.015 | C | File03.002 | B | File04.005 |
| 54 | A | File03.016 | C | File03.003 | B | File04.006 |
| 55 | B | File03.009 | C | File03.004 | A | File04.007 |
| 56 | B | File03.010 | C | File03.005 | A | File04.008 |
| 57 | A | File04.007 | B | File04.004 | C | File05.001 |
| 58 | A | File04.008 | C | File04.001 | B | File05.002 |
| 59 | B | File04.005 | C | File04.002 | A | File05.003 |
| 60 | B | File04.006 | C | File04.003 | A | File05.004 |
| 61 | A | File05.003 | B | File05.002 | C | File06.001 |
| 62 | A | File05.004 | C | File05.001 | B | File06.002 |
| 63 | B | File06.002 | C | File06.001 | A | File07.001 |

| Filename | Date and Time |
|---|---|
| custom_log_2006-05-29.21.07.17.log.sm-ad3.gz | 06-29-2006 15:44 |
| custom_log_2006-01-31.20.04.53.log.sm-ad5.gz | 06-29-2006 15:44 |
| custom_log_2006-01-31.20.00.16.log.sm-ad3.gz | 06-29-2006 15:44 |
| custom_log_2006-05-29.21.05.50.log.sm-ad7.gz | 06-29-2006 15:44 |
| ⋮ | ⋮ |

*FIG. 7*

| Gender | Age | Income | Ethnicity | Household Size | Education Level |
|---|---|---|---|---|---|
| Male | 0-17 | 0-$25,000 | Caucasian | 1 person | Some high school |
| Female | 18-24 | $35,000-$50,000 | African American | 2 people | High school degree |
| | 25-35 | $50,000-$75,000 | Asian American | 3-4 people | Some college |
| | 36-50 | $75,000-$100,000 | Hispanic | 5+ people | Associates degree |
| | 51-65 | $100,000-$150,000 | | | Bachelors degree |
| | 65+ | $150,000+ | | | Graduate degree |

| UserID | Col2 | Col3 | Col4 | EpochTime | Delta | URL |
|---|---|---|---|---|---|---|
| 80168544 | X | X | X | 1150587861 | 0 | http://www1.myspace.com/index.cfm?fuseaction=user.retrievepassword&error=1&mytoken=72497709-a52d-1047-69996101b5807eec69143912 |
| 80168544 | X | X | X | 1150587867 | 27 | http://www1.myspace.com/index.cfm?fuseaction=user.retrievepassword&error=1&mytoken=533fb70e-d311-8f5d-d7d06f05113fc5a669117282 |
| 80168544 | X | X | X | 1150587868 | 43 | http://www1.myspace.com/index.cfm?fuseaction=user.retrievepassword&error=1&mytoken=6404e666-5ae1-4439-92fa527bde06b977852081921 |
| 80168575 | X | X | X | 1150587773 | 27 | http://www.hmongspace.com/ |
| 80168582 | X | X | X | 1150587873 | 7 | http://my.netzero.net/s/sp?r=al&cf=sp&mem=megogo&login=6c94ca549a7cfc09d0e1f7990d08a77e/megogo:netzero.net/1150613060/30/sss.0.93388/&ts=4494f644&a=541893270000019&b=1150527600000&c=1150527600000&d=0&i=4.0&n=emoc&o=i&ut= |
| 80168582 | X | X | X | 1150587999 | 0 | http://2144\|www.google.com/ |
| 80168583 | X | X | X | 1150599062 | 31 | http://about:blank/ |
| 80168583 | X | X | X | 1150599145 | 7 | http://about:blank/ |
| 80168585 | X | X | X | 1150587926 | 0 | http://gamepuck.com/ |
| 80168585 | X | X | X | 1150587926 | 21 | http://my.netzero.net/s/sp?r=al&cf=sp&mem=rayisgood&login=d3560a4ad9a5640ac9f520b4a084db07/rayisgood:netzero.net/1150613118/30/sss.8.5490/&ts=4494f67e&A=539828640003869&B=1150527600000&C=1150527600000&D=0&I=4.0.5&N=EMOC&O=I&UT= |
| ⋮ | ⋮ | ⋮ | ⋮ | ⋮ | ⋮ | ⋮ |

FIG. 10A

| UserID | EpochTime | Delta | WebsiteName |
|---|---|---|---|
| 80168544 | 1150587861 | 0 | www1.myspace.com |
| 80168544 | 1150587867 | 27 | www1.myspace.com |
| 80168544 | 1150587868 | 43 | www1.myspace.com |
| 80168575 | 1150587773 | 27 | www.hmongspace.com |
| 80168582 | 1150587873 | 7 | my.netzero.net |
| 80168582 | 1150587999 | 0 | 2144|www.google.com |
| 80168583 | 1150599062 | 31 | about:blank |
| 80168583 | 1150599145 | 7 | about:blank |
| 80168585 | 1150587926 | 0 | gamepuck.com |
| 80168585 | 1150587926 | 21 | my.netzero.net |
| ⋮ | ⋮ | ⋮ | ⋮ |

| Website | Age Group 1 | Age Group 2 | Age Group 3 | Age Group 4 | Age Group 5 | Age Group 6 | Age Group 7 |
|---|---|---|---|---|---|---|---|
| littleswimmers.com | 0 | 17.27 | 55.4 | 20.86 | 2.88 | 3.6 | 0 |
| yandex.ru | 1.83 | 45.04 | 36.39 | 9.61 | 4.0 | 2.25 | 0.89 |
| moneyhome.com | 0 | 7.89 | 2.63 | 63.16 | 15.79 | 9.21 | 1.32 |
| awardsling,com | 0 | 4.17 | 68.06 | 18.06 | 2.78 | 6.94 | 0 |
| tradelair.com | 46.53 | 9.03 | 13.89 | 11.11 | 18.4 | 1.04 | 0 |
| poolcenter.com | 8.61 | 0.66 | 58.94 | 15.23 | 7.62 | 5.96 | 2.98 |
| officialusa.com | 0 | 9.57 | 69.15 | 9.57 | 10.64 | 0 | 1.06 |
| geocaching.com | 0 | 2.42 | 4.85 | 57.58 | 27.88 | 7.27 | 0 |
| metrotravelguide.com | 0 | 9.48 | 31.9 | 48.28 | 7.76 | 2.59 | 0 |
| . | . | . | . | . | . | . | . |

| Website | Male Probability |
|---|---|
| thesearchmall.com | 78.69 |
| homecafe.com | 5.24 |
| childsafenetwork.org | 24.26 |
| smithcorp.info | 84.62 |
| thenotebookmovie.com | 18.6 |
| fxnetworks.com | 24.88 |
| strattera.com | 23.96 |
| zamingo.com | 77.4 |
| adecco.com | 21.76 |
| . | . |

| UserID | TSAgeGrp1 TSAgeSkewed | TSAgeGrp2 TSMaleSkewed | TSAgeGrp3 TSFemaleSkewed | TSAgeGrp4 nLines | TSAgeGrp5 nLinesMale | TSAgeGrp6 nLinesFemale | TSAgeGrp7 nLinesAge |
|---|---|---|---|---|---|---|---|
| 141846 | 0.0 | 1114.3 | 371.4 | 1114.3 | 1485.7 | 21542.9 | 36771.4 |
| | 624.0 | 0.0 | 0.0 | 0 | 0 | 0 | 59 |
| 152026 | 3477.8 | 7651.1 | 46602.2 | 2782.2 | 2086.7 | 0.0 | 0.0 |
| | 626.0 | 50642.7 | 626.0 | 765 | 515 | 250 | 92 |
| 218970 | 0.0 | 0.0 | 0.0 | 0.0 | 0.0 | 0.0 | 0.0 |
| | 0.0 | 0.0 | 0.0 | 626 | 362 | 264 | 119 |
| 219492 | 2521.7 | 472.8 | 6777.0 | 735.5 | 577.9 | 315.2 | 0.0 |
| | 114.0 | 9929.0 | 114.0 | 528 | 451 | 77 | 32 |
| 245192 | 0.0 | 2105.4 | 4986.5 | 2216.2 | 13629.7 | 775.7 | 886.5 |
| | 246.0 | 0.0 | 0.0 | 0 | 0 | 0 | 72 |
| 277447 | 16771.7 | 2396.0 | 1089.1 | 4547.1 | 1198.0 | 871.3 | 0.0 |
| | 269.0 | 0.0 | 0.0 | 0 | 0 | 0 | 54 |
| 278403 | 0.0 | 9484.2 | 21109.9 | 305.9 | 0.0 | 0.0 | 0.0 |
| | 309.0 | 0.0 | 0.0 | 0 | 0 | 0 | 125 |
| ... | ... | ... | ... | ... | ... | ... | ... |

| UserID | Gender | AgeGroup |
|---|---|---|
| 10001581 | - | 3 |
| 10005471 | F | 4 |
| 10005880 | F | 1 |
| 10006836 | M | -1 |
| 10008139 | M | 1 |
| 10008142 | M | 3 |
| 10008273 | F | 3 |
| 10008395 | M | 1 |
| 10008790 | F | 1 |
| 10009118 | M | 3 |
| ⋮ | ⋮ | ⋮ |

*FIG. 14*

|  |  | Internet | games.yahoo.com | en.wikipedia.org | music.yahoo.com | fantasysports.yahoo.com |
|---|---|---|---|---|---|---|
| Gender | Male | 49.42% | 56.94% | 70.42% | 57.09% | 68.06% |
|  | Female | 50.58% | 43.06% | 29.58% | 42.91% | 31.94% |
| Age Groups | 2-17 | 18.28% | 19.66% | 23.94% | 26.76% | 21.28% |
|  | 18-24 | 11.45% | 10.61% | 13.10% | 12.26% | 9.49% |
|  | 25-34 | 15.87% | 11.97% | 17.90% | 13.41% | 25.11% |
|  | 35-44 | 20.37% | 14.96% | 19.96% | 12.98% | 19.81% |
|  | 45-54 | 18.25% | 17.45% | 21.15% | 27.00% | 20.27% |
|  | 55-64 | 10.51% | 22.41% | 3.26% | 3.92% | 2.01% |
|  | 65+ | 5.28% | 2.94% | 0.69% | 3.67% | 2.03% |
| Ethnicity | Caucasian | 71.86% | 62.83% | 63.67% | 61.38% | 82.43% |
|  | African Am. | 9.34% | 26.88% | 12.33% | 15.77% | 7.82% |
|  | Asian | 4.01% | 4.03% | 9.56% | 4.15% | 4.36% |
|  | Hispanic | 14.79% | 6.25% | 14.44% | 18.69% | 5.39% |
| Annual Income | <$14K | 5.52% | 1.40% | 0.75% | 1.06% | 0.19% |
|  | $15-25K | 3.78% | 12.41% | 15.43% | 19.26% | 6.46% |
|  | $25-40K | 9.28% | 21.03% | 24.62% | 26.79% | 18.86% |
|  | $40-60K | 28.28% | 4.75% | 3.45% | 4.63% | 1.73% |
|  | $60-75K | 12.20% | 15.21% | 13.51% | 11.00% | 34.41% |
|  | $75-100K | 18.11% | 9.35% | 15.59% | 10.91% | 11.67% |
|  | >$100K | 22.83% | 35.85% | 26.65% | 26.35% | 26.69% |
| Education | High School | 39.40% | 43.26% | 33.18% | 35.78% | 27.03% |
|  | College | 49.68% | 28.11% | 17.98% | 27.07% | 56.17% |
|  | Graduate School | 10.91% | 28.64% | 48.84% | 37.15% | 16.80% |
| Children | With Children | 27.00% | 86.65% | 87.04% | 97.51% | 85.07% |
|  | Without Children | 73.00% | 13.35% | 12.96% | 2.49% | 14.93% |

| Website Name | Day part | MaleAge1 | FemaleAge1 | MaleAge2 | FemaleAge2 | MaleAge3 | FemaleAge3 | MaleAge4 | FemaleAge4 | MaleAge5 | FemaleAge5 | MaleAge6 | FemaleAge6 | MaleAge7 | FemaleAge7 |
|---|---|---|---|---|---|---|---|---|---|---|---|---|---|---|---|
| geocities.com | 1 | 20 | 7 | 13 | 0 | 55 | 11 | 49 | 16 | 9 | 9 | 0 | 0 | 0 | 0 |
| geocities.com | 2 | 57 | 0 | 9 | 0 | 31 | 14 | 39 | 20 | 16 | 5 | 0 | 0 | 0 | 0 |
| geocities.com | 3 | 88 | 0 | 3 | 0 | 19 | 4 | 3 | 2 | 1 | 0 | 0 | 0 | 0 | 0 |
| geocities.com | 4 | 18 | 0 | 0 | 0 | 44 | 10 | 14 | 2 | 0 | 1 | 0 | 0 | 0 | 0 |
| geocities.com | 5 | 14 | 0 | 0 | 0 | 28 | 116 | 87 | 6 | 2 | 6 | 1 | 0 | 0 | 0 |
| geocities.com | 6 | 18 | 4 | 5 | 0 | 108 | 8 | 22 | 15 | 29 | 4 | 0 | 0 | 0 | 0 |
| geocities.com | 7 | 32 | 33 | 6 | 0 | 27 | 18 | 4 | 27 | 0 | 11 | 0 | 0 | 0 | 0 |
| ... | ... | ... | | ... | | ... | | ... | | ... | | ... | | ... | |

FIG. 16A

| Website Name | Day part | MaleAge1 | FemaleAge1 | MaleAge2 | FemaleAge2 | MaleAge3 | FemaleAge3 | MaleAge4 | FemaleAge4 | MaleAge5 | FemaleAge5 | MaleAge6 | FemaleAge6 | MaleAge7 | FemaleAge7 |
|---|---|---|---|---|---|---|---|---|---|---|---|---|---|---|---|
| geocities.com | 1 | 352 | 91 | 94 | 44 | 1440 | 319 | 450 | 294 | 170 | 188 | 0 | 0 | 0 | 34 |
| geocities.com | 2 | 251 | 60 | 62 | 4 | 896 | 323 | 700 | 240 | 190 | 104 | 0 | 0 | 0 | 0 |
| geocities.com | 3 | 247 | 12 | 381 | 10 | 895 | 116 | 133 | 127 | 126 | 72 | 0 | 0 | 0 | 0 |
| geocities.com | 4 | 233 | 8 | 66 | 2 | 610 | 105 | 90 | 196 | 84 | 18 | 0 | 0 | 2 | 0 |
| geocities.com | 5 | 158 | 39 | 6 | 8 | 905 | 269 | 148 | 212 | 74 | 44 | 0 | 0 | 0 | 0 |
| geocities.com | 6 | 483 | 52 | 36 | 44 | 1102 | 233 | 196 | 253 | 86 | 188 | 2 | 2 | 2 | 0 |
| geocities.com | 7 | 326 | 49 | 32 | 38 | 951 | 383 | 341 | 264 | 138 | 86 | 0 | 0 | 0 | 0 |
| ... | ... | ... | | ... | | ... | | ... | | ... | | ... | | ... | |

| 600 |
|---|
| Fraction of users visiting the website in MaleAgeGroup 1 |
| Fraction of users visiting the website in MaleAgeGroup 2 |
| Fraction of users visiting the website in MaleAgeGroup 3 |
| Fraction of users visiting the website in MaleAgeGroup 4 |
| Fraction of users visiting the website in MaleAgeGroup 5 |
| Fraction of users visiting the website in MaleAgeGroup 6 |
| Fraction of users visiting the website in MaleAgeGroup 7 |
| Fraction of users visiting the website in FemaleAgeGroup 1 |
| Fraction of users visiting the website in FemaleAgeGroup 2 |
| Fraction of users visiting the website in FemaleAgeGroup 3 |
| Fraction of users visiting the website in FemaleAgeGroup 4 |
| Fraction of users visiting the website in FemaleAgeGroup 5 |
| Fraction of users visiting the website in FemaleAgeGroup 6 |
| Fraction of users visiting the website in FemaleAgeGroup 7 |

| Field Name | Description of the Field |
|---|---|
| SiteID | Identification of website (e.g., as expressed in the log data files 210) |
| SiteName | Name of the website (e.g., as expressed in the clean sorted daily web traversal history file 442) |
| MA1 | Fraction of users visiting the website in MaleAgeGroup 1 |
| MA2 | Fraction of users visiting the website in MaleAgeGroup 2 |
| MA3 | Fraction of users visiting the website in MaleAgeGroup 3 |
| MA4 | Fraction of users visiting the website in MaleAgeGroup 4 |
| MA5 | Fraction of users visiting the website in MaleAgeGroup 5 |
| MA6 | Fraction of users visiting the website in MaleAgeGroup 6 |
| MA7 | Fraction of users visiting the website in MaleAgeGroup 7 |
| FA1 | Fraction of users visiting the website in FemaleAgeGroup 1 |
| FA2 | Fraction of users visiting the website in FemaleAgeGroup 2 |
| FA3 | Fraction of users visiting the website in FemaleAgeGroup 3 |
| FA4 | Fraction of users visiting the website in FemaleAgeGroup 4 |
| FA5 | Fraction of users visiting the website in FemaleAgeGroup 5 |
| FA6 | Fraction of users visiting the website in FemaleAgeGroup 6 |
| FA7 | Fraction of users visiting the website in FemaleAgeGroup 7 |

| Field Name | Description of the Field |
|---|---|
| SiteID | Identification of website (e.g., as expressed in the log data files 210) |
| SiteName | Name of the website (e.g., as expressed in the clean sorted daily web traversal history file 442) |
| Day | Day of the week (e.g., 1-7 denoting Sunday through Saturday) |
| MA1 | Fraction of users visiting the website in MaleAgeGroup 1 on that day |
| MA2 | Fraction of users visiting the website in MaleAgeGroup 2 on that day |
| MA3 | Fraction of users visiting the website in MaleAgeGroup 3 on that day |
| MA4 | Fraction of users visiting the website in MaleAgeGroup 4 on that day |
| MA5 | Fraction of users visiting the website in MaleAgeGroup 5 on that day |
| MA6 | Fraction of users visiting the website in MaleAgeGroup 6 on that day |
| MA7 | Fraction of users visiting the website in MaleAgeGroup 7 on that day |
| FA1 | Fraction of users visiting the website in FemaleAgeGroup 1 on that day |
| FA2 | Fraction of users visiting the website in FemaleAgeGroup 2 on that day |
| FA3 | Fraction of users visiting the website in FemaleAgeGroup 3 on that day |
| FA4 | Fraction of users visiting the website in FemaleAgeGroup 4 on that day |
| FA5 | Fraction of users visiting the website in FemaleAgeGroup 5 on that day |
| FA6 | Fraction of users visiting the website in FemaleAgeGroup 6 on that day |
| FA7 | Fraction of users visiting the website in FemaleAgeGroup 7 on that day |

FIG. 17C

| Website | SiteID | Day | MA1 | MA2 | MA3 | MA4 | MA5 | MA6 | MA7 | FA1 | FA2 | FA3 | FA4 | FA5 | FA6 | FA7 |
|---|---|---|---|---|---|---|---|---|---|---|---|---|---|---|---|---|
| myfamily.com | 14 | 2 | 0.06 | 0.00 | 0.14 | 0.09 | 0.16 | - | - | 0.05 | 0.01 | 0.25 | 0.15 | 0.08 | 0.02 | - |
| myfamily.com | 14 | 3 | 0.05 | 0.01 | 0.14 | 0.07 | 0.16 | - | - | 0.03 | 0.01 | 0.24 | 0.20 | 0.08 | 0.01 | - |
| myfamily.com | 14 | 4 | 0.03 | - | 0.22 | 0.07 | 0.11 | - | - | 0.03 | 0.01 | 0.21 | 0.13 | 0.15 | 0.02 | - |
| myfamily.com | 14 | 5 | 0.07 | 0.00 | 0.17 | 0.09 | 0.15 | - | - | 0.03 | 0.01 | 0.20 | 0.13 | 0.14 | 0.01 | - |
| myfamily.com | 14 | 6 | 0.05 | 0.00 | 0.18 | 0.06 | 0.13 | - | - | 0.05 | 0.03 | 0.26 | 0.15 | 0.09 | 0.01 | - |
| myfamily.com | 14 | 7 | 0.08 | 0.00 | 0.14 | 0.08 | 0.16 | - | - | 0.06 | 0.01 | 0.24 | 0.13 | 0.08 | 0.02 | - |
| ezula.com | 17 | 1 | 0.22 | 0.03 | 0.27 | 0.06 | 0.03 | - | - | 0.02 | 0.10 | 0.17 | 0.02 | 0.07 | - | - |
| ezula.com | 17 | 2 | 0.20 | 0.01 | 0.20 | 0.04 | 0.02 | - | - | 0.04 | 0.02 | 0.19 | 0.10 | 0.20 | - | - |
| ezula.com | 17 | 3 | 0.27 | 0.04 | 0.23 | 0.07 | 0.02 | - | - | 0.05 | 0.04 | 0.09 | 0.06 | 0.14 | - | - |
| ezula.com | 17 | 4 | 0.19 | 0.03 | 0.14 | 0.05 | 0.03 | - | - | 0.05 | 0.10 | 0.16 | 0.08 | 0.18 | - | - |
| ezula.com | 17 | 5 | 0.36 | 0.01 | 0.24 | 0.06 | 0.05 | - | - | 0.02 | 0.02 | 0.08 | 0.05 | 0.10 | - | - |
| ezula.com | 17 | 6 | 0.32 | 0.01 | 0.27 | 0.06 | 0.05 | - | - | 0.07 | 0.04 | 0.09 | 0.02 | 0.09 | - | - |
| ezula.com | 17 | 7 | 0.26 | 0.04 | 0.22 | 0.10 | 0.06 | - | - | 0.03 | 0.02 | 0.13 | 0.02 | 0.13 | - | - |
| nbc.com | 38 | 1 | 0.07 | 0.01 | 0.28 | 0.08 | 0.05 | 0.00 | - | 0.07 | 0.03 | 0.19 | 0.16 | 0.08 | - | - |
| nbc.com | 38 | 2 | 0.09 | 0.01 | 0.25 | 0.07 | 0.08 | - | - | 0.05 | 0.01 | 0.24 | 0.12 | 0.07 | - | 0.00 |
| nbc.com | 38 | 3 | 0.10 | 0.01 | 0.29 | 0.06 | 0.03 | - | 0.00 | 0.10 | 0.01 | 0.25 | 0.11 | 0.06 | - | 0.00 |
| nbc.com | 38 | 4 | 0.07 | 0.01 | 0.26 | 0.13 | 0.03 | - | 0.00 | 0.04 | 0.01 | 0.26 | 0.13 | 0.06 | - | 0.00 |
| nbc.com | 38 | 5 | 0.08 | 0.04 | 0.25 | 0.07 | 0.03 | - | 0.00 | 0.07 | 0.01 | 0.24 | 0.12 | 0.08 | 0.00 | - |
| nbc.com | 38 | 6 | 0.10 | 0.01 | 0.27 | 0.10 | 0.03 | - | 0.00 | 0.07 | 0.01 | 0.20 | 0.15 | 0.08 | 0.00 | - |
| nbc.com | 38 | 7 | 0.08 | 0.01 | 0.26 | 0.08 | 0.03 | - | 0.00 | 0.07 | 0.02 | 0.19 | 0.17 | 0.10 | - | - |

| Field Name | Description of the Field |
|---|---|
| SiteID | Identification of website (e.g., as expressed in the log data files 210) |
| SiteName | Name of the website (e.g., as expressed in the clean sorted daily web traversal history file 442) |
| Day | Day of the week (e.g., 1-7 denoting Sunday through Saturday) |
| Hour | Hour of the day (e.g., 1-24) |
| MA1 | Fraction of users visiting the website in MaleAgeGroup 1 on that day and hour |
| MA2 | Fraction of users visiting the website in MaleAgeGroup 2 on that day and hour |
| MA3 | Fraction of users visiting the website in MaleAgeGroup 3 on that day and hour |
| MA4 | Fraction of users visiting the website in MaleAgeGroup 4 on that day and hour |
| MA5 | Fraction of users visiting the website in MaleAgeGroup 5 on that day and hour |
| MA6 | Fraction of users visiting the website in MaleAgeGroup 6 on that day and hour |
| MA7 | Fraction of users visiting the website in MaleAgeGroup 7 on that day and hour |
| FA1 | Fraction of users visiting the website in FemaleAgeGroup 1 on that day and hour |
| FA2 | Fraction of users visiting the website in FemaleAgeGroup 2 on that day and hour |
| FA3 | Fraction of users visiting the website in FemaleAgeGroup 3 on that day and hour |
| FA4 | Fraction of users visiting the website in FemaleAgeGroup 4 on that day and hour |
| FA5 | Fraction of users visiting the website in FemaleAgeGroup 5 on that day and hour |
| FA6 | Fraction of users visiting the website in FemaleAgeGroup 6 on that day and hour |
| FA7 | Fraction of users visiting the website in FemaleAgeGroup 7 on that day and hour |

FIG. 17E

| UserID | Date Created | Date Updated | SiteID/ Counts | SiteID/ Counts | SiteID/ Counts | ... |
|---|---|---|---|---|---|---|
| 22EB899C25C9BA49D | 60710 | 60710 | 1269/ 0001 | | | ... |
| 22EB899C25D9BA49D | 60710 | 60710 | 1454/ 0002 | | | ... |
| 22EB899C25E9BA49D | 60710 | 60710 | 1397/ 0001 | 0400/ 0002 | | ... |
| 22EB899C25F9BA49D | 60710 | 60710 | 1817/ 0003 | | | ... |
| 22EB899C2609BA49D | 60710 | 60710 | 1169/ 0001 | | | ... |
| 22EB899C2619BA49D | 60710 | 60710 | 1407/ 0001 | | | ... |
| 22EB899C2629BA49D | 60710 | 60710 | 1268/ 0009 | 0269/ 0011 | | ... |
| 22EB899C2639BA49D | 60710 | 60710 | 1817/ 0001 | | | ... |
| 22EB899C2649BA49D | 60710 | 60710 | 0287/ 0001 | | | ... |
| 22EB899C2659BA49D | 60710 | 60710 | 0162/ 0002 | 0510/ 0004 | 0511/ 0003 | ... |
| ⋮ | ⋮ | ⋮ | ⋮ | ⋮ | ⋮ | ⋮ |

| Field Name | Description of the Field |
|---|---|
| MA1 | Probability that the anonymous user is in MaleAgeGroup 1 |
| MA2 | Probability that the anonymous user is in MaleAgeGroup 2 |
| MA3 | Probability that the anonymous user is in MaleAgeGroup 3 |
| MA4 | Probability that the anonymous user is in MaleAgeGroup 4 |
| MA5 | Probability that the anonymous user is in MaleAgeGroup 5 |
| MA6 | Probability that the anonymous user is in MaleAgeGroup 6 |
| MA7 | Probability that the anonymous user is in MaleAgeGroup 7 |
| FA1 | Probability that the anonymous user is in FemaleAgeGroup 1 |
| FA2 | Probability that the anonymous user is in FemaleAgeGroup 2 |
| FA3 | Probability that the anonymous user is in FemaleAgeGroup 3 |
| FA4 | Probability that the anonymous user is in FemaleAgeGroup 4 |
| FA5 | Probability that the anonymous user is in FemaleAgeGroup 5 |
| FA6 | Probability that the anonymous user is in FemaleAgeGroup 6 |
| FA7 | Probability that the anonymous user is in FemaleAgeGroup 7 |

| Field Name | Description of the Field |
|---|---|
| UserID | User identification data (e.g., as stored in the cookies file on the user's computer) |
| DateCreated | Date on which the user probability vector for UserID was created |
| LastUpdated | Date on which the user probability vector for UserID was last updated |
| nSites | Number of profiled websites visited by UserID |
| MA1 | Probability that the anonymous user is in MaleAgeGroup 1 |
| MA2 | Probability that the anonymous user is in MaleAgeGroup 2 |
| MA3 | Probability that the anonymous user is in MaleAgeGroup 3 |
| MA4 | Probability that the anonymous user is in MaleAgeGroup 4 |
| MA5 | Probability that the anonymous user is in MaleAgeGroup 5 |
| MA6 | Probability that the anonymous user is in MaleAgeGroup 6 |
| MA7 | Probability that the anonymous user is in MaleAgeGroup 7 |
| FA1 | Probability that the anonymous user is in FemaleAgeGroup 1 |
| FA2 | Probability that the anonymous user is in FemaleAgeGroup 2 |
| FA3 | Probability that the anonymous user is in FemaleAgeGroup 3 |
| FA4 | Probability that the anonymous user is in FemaleAgeGroup 4 |
| FA5 | Probability that the anonymous user is in FemaleAgeGroup 5 |
| FA6 | Probability that the anonymous user is in FemaleAgeGroup 6 |
| FA7 | Probability that the anonymous user is in FemaleAgeGroup 7 |

FIG. 19B

| UserID | DateCreated | LastUpdate | nSites | MA1 | MA2 | MA3 | MA4 | MA5 | MA6 | MA7 | FA1 | FA2 | FA3 | FA4 | FA5 | FA6 | FA7 |
|---|---|---|---|---|---|---|---|---|---|---|---|---|---|---|---|---|---|
| 1424DA00777D6 | 060629 | 060721 | 2 | 0.03 | 0.07 | 0.55 | 0.22 | 0.02 | 0.00 | 0.00 | 0.00 | 0.00 | 0.07 | 0.04 | 0.00 | 0.00 | 0.00 |
| 1432FB00006D6 | 060629 | 060721 | 2 | 0.13 | 0.00 | 0.24 | 0.19 | 0.01 | 0.00 | 0.00 | 0.05 | 0.01 | 0.21 | 0.07 | 0.09 | 0.00 | 0.00 |
| 143EF700013D3 | 060629 | 060721 | 2 | 0.10 | 0.01 | 0.27 | 0.12 | 0.04 | 0.00 | 0.00 | 0.04 | 0.01 | 0.16 | 0.16 | 0.09 | 0.00 | 0.00 |
| 144C360001CD4 | 060629 | 060721 | 2 | 0.03 | 0.07 | 0.55 | 0.22 | 0.02 | 0.00 | 0.00 | 0.00 | 0.00 | 0.07 | 0.04 | 0.00 | 0.00 | 0.00 |
| 14514600082D5 | 060629 | 060721 | 2 | 0.10 | 0.01 | 0.29 | 0.06 | 0.03 | 0.00 | 0.00 | 0.10 | 0.01 | 0.25 | 0.11 | 0.06 | 0.00 | 0.00 |
| 14843700CCD4 | 060629 | 060721 | 2 | 0.03 | 0.07 | 0.55 | 0.22 | 0.02 | 0.00 | 0.00 | 0.00 | 0.00 | 0.07 | 0.04 | 0.00 | 0.00 | 0.00 |
| 14898C00032D4 | 060629 | 060721 | 2 | 0.10 | 0.01 | 0.29 | 0.06 | 0.03 | 0.00 | 0.00 | 0.10 | 0.01 | 0.25 | 0.11 | 0.06 | 0.00 | 0.00 |
| 1489BE0017ED3 | 060629 | 060721 | 2 | 0.10 | 0.01 | 0.29 | 0.06 | 0.03 | 0.00 | 0.00 | 0.10 | 0.01 | 0.25 | 0.11 | 0.06 | 0.00 | 0.00 |
| 148ACC000CBD5 | 060629 | 060721 | 2 | 0.03 | 0.07 | 0.55 | 0.22 | 0.02 | 0.00 | 0.00 | 0.00 | 0.00 | 0.07 | 0.04 | 0.00 | 0.00 | 0.00 |
| 148F9200023D7 | 060629 | 060721 | 2 | 0.10 | 0.01 | 0.27 | 0.09 | 0.05 | 0.00 | 0.00 | 0.04 | 0.02 | 0.20 | 0.16 | 0.07 | 0.00 | 0.00 |
| ... | ... | ... | ... | ... | ... | ... | ... | ... | ... | ... | ... | ... | ... | ... | ... | ... | ... |

| UserID | DemoDetail |
|---|---|
| 000000000000 | 010010100000000100110111 |
| 138B4000002D6 | 000010000110001100110111 |
| 138B410000AD5 | 000010000110001100110111 |
| 138B410000ED5 | 000010000110001100110111 |
| 138B410001CD3 | 000010000110001100110111 |
| 138B4100024D5 | 010010000110001100110111 |
| 138B4100026D7 | 000010000110001100110111 |
| 138B410002ED3 | 000010000110001100110111 |
| ⋮ | ⋮ |

| DemoGroup | Description | Threshold |
|---|---|---|
| 1 | Male | probability Male => 0.6 |
| 2 | Female | probability Female => 0.6 |
| 3 | Unknown gender | Neither of the above two conditions is satisfied |
| 4 | Age Range = 0-17 (AgeGroup1) | 0.25 |
| 5 | Age Range = 18-24 (AgeGroup2) | 0.25 |
| 6 | Age Range = 25-34 (AgeGroup3) | 0.25 |
| 7 | Age Range = 35-44 (AgeGroup4) | 0.25 |
| 8 | Age Range = 45-54 (AgeGroup5) | 0.25 |
| 9 | Age Range = 55-64 (AgeGroup6) | 0.25 |
| 10 | Age Range = 65+ (AgeGroup7) | 0.25 |
| 11 | Age Range = 18-34 (AgeGroups2+3) | 0.4 |
| 12 | Age Range = 25-44 (AgeGroups3+4) | 0.4 |
| 13 | Age Range = 35-54 (AgeGroups4+5) | 0.4 |
| 14 | Age Range = 45-64 (AgeGroups5+6) | 0.4 |
| 15 | Age Range = 55+ (AgeGroups6+7) | 0.4 |
| 16 | Age Range = 18-44 (AgeGroups2+3+4) | 0.5 |
| 17 | Age Range = 25-54 (AgeGroups3+4+5) | 0.5 |
| 18 | Age Range = 35-64 (AgeGroups4+5+6) | 0.5 |
| 19 | Age Range = 45+ (AgeGroups5+6+7) | 0.5 |
| 20 | Age Range = 18-54 (AgeGroups2+3+4+5) | 0.5 |
| 21 | Age Range = 25-64 (AgeGroups3+4+5+6) | 0.5 |
| 22 | Age Range = 35+ (AgeGroups4+5+6+7) | 0.5 |
| 23 | Age Range = 18-64 (AgeGroups2+3+4+5+6) | 0.5 |
| 24 | Age Range = 25+ (AgeGroups3+4+5+6+7) | 0.5 |
| 25 | Age Range = 18+ (AgeGroups2+3+4+5+6+7) | 0.5 |

732

SYSTEM AND METHOD OF DETERMINING USER DEMOGRAPHIC PROFILES

CROSS-REFERENCE TO RELATED APPLICATIONS

This application is a divisional of U.S. patent application Ser. No. 13/633,759 filed on Oct. 2, 2012, entitled SYSTEM AND METHOD OF DETERMINING USER PROFILES by Timothy Charles Vanderhook, et. al., which application is a continuation of U.S. patent application Ser. No. 12/709,401 filed on Feb. 19, 2010, U.S. Pat. No. 8,281,005 issued on Oct. 2, 2012, entitled SYSTEM AND METHOD OF DETERMINING USER PROFILES by Timothy Charles Vanderhook, et. al., which application is a continuation of U.S. patent application Ser. No. 11/852,775, filed Sep. 10, 2007, U.S. Pat. No. 7,698,422 issued on Apr. 13, 2010, entitled SYSTEM AND METHOD OF DETERMINING USER DEMOGRAPHIC PROFILES OF ANONYMOUS USERS by Timothy Charles Vanderhook, et. al., which applications are incorporated by reference herein.

BACKGROUND OF THE INVENTION

Field of the Invention

The present invention relates generally to systems and method for presenting information (e.g., advertisements) to web browsers accessing websites via the Internet.

Description of the Related Art

Traditional web-based advertising systems or networks target content by displaying advertisements based on the content of the websites in the network. Existing systems which seek to provide information regarding the demographic profiles of users of these websites do so purely through registration data or internet audience measurement services. However, such systems do not provide sufficiently accurate information regarding these users. These inaccuracies can result in missed opportunities to present advertisements to users having a selected demographic profile and in extraneous presentations of the advertisements to users outside the desired target demographic profile.

SUMMARY

In certain embodiments, a method determines a user demographic profile of an anonymous user that visits one or more websites of a predetermined group of websites. The method comprises determining whether an anonymous user's computer has user identification data installed thereon. Determining whether the user identification data is installed is performed upon the anonymous user visiting a website of the predetermined group of websites. The user identification data is unique to the anonymous user. The method further comprises installing the user identification data on the anonymous user's computer if the anonymous user's computer does not have the user identification data installed thereon. The method further comprises generating a first record of visits by the anonymous user to the websites of the predetermined group of websites. The method further comprises providing one or more website profiles comprising demographic characteristics of each website visited by the anonymous user of the predetermined group of websites. The method further comprises calculating an estimated user demographic profile of the anonymous user by using the first record of visits by the anonymous user and the one or more website profiles.

In certain embodiments, a method presents information to a plurality of anonymous users that visit one or more websites of a predetermined group of websites. The method comprises determining user demographic profiles of the plurality of anonymous users. Determining the user demographic profiles comprises determining whether each anonymous user's computer has user identification data installed thereon. Determining whether the user identification data is installed is performed for each anonymous user upon the anonymous user visiting a website of the predetermined group of websites. The user identification data is unique to the anonymous user. Determining the user demographic profile further comprises installing user identification data on each anonymous user's computer if the anonymous user's computer does not have the user identification data installed thereon. Determining the user demographic profile further comprises generating a first record of visits by each anonymous user to the websites of the predetermined group of websites. Determining the user demographic profile further comprises providing one or more website profiles comprising demographic characteristics of each website visited by the anonymous user of the predetermined group of websites. Determining the user demographic profile further comprises calculating an estimated user demographic profile of each anonymous user by using the first record of visits of the anonymous users and the one or more website profiles. The method further comprises receiving a signal indicating that an anonymous user of the plurality of anonymous users is visiting a website of the predetermined group of websites. The method further comprises using the estimated user demographic profile of the anonymous user to select information to be presented to the anonymous user. The method further comprises transmitting the information to the anonymous user's computer.

In certain embodiments, a computer-readable medium has instructions stored thereon which cause a general-purpose computer to perform a method of determining a user demographic profile of an anonymous user of one or more websites of a predetermined group of websites. The method comprises determining whether an anonymous user's computer has user identification data installed thereon. Determining whether the user identification data is installed is performed upon the anonymous user visiting a website of the predetermined group of websites, the user identification data unique to the anonymous user. The method further comprises installing the user identification data on the anonymous user's computer if the anonymous user's computer does not have the user identification data installed thereon. The method further comprises generating a first record of visits by the anonymous user to the websites of the predetermined group of websites. The method further comprises providing one or more website profiles comprising demographic characteristics of each website visited by the anonymous user of the predetermined group of websites. The method further comprises calculating an estimated user demographic profile of the anonymous user by using the first record of visits by the anonymous user and the one or more website profiles.

In certain embodiments, a computer system determines a user demographic profile of an anonymous user of one or more websites of a predetermined group of websites. The computer system comprises means for receiving a signal transmitted via the Internet indicative of whether an anonymous user's computer has user identification data installed thereon. Receiving the signal is performed upon the anonymous user visiting a website of the predetermined group of websites. The user identification data is unique to the anonymous user. The computer system further comprises means for transmitting the user identification data to the anonymous user's computer via the Internet if the anonymous user's computer does not have the user identification data installed thereon. The computer system further comprises means for generating a first record of visits by the anonymous user to the websites of the predetermined group of websites based on signals received via the Internet. The computer system further comprises means for providing one or more website profiles comprising demographic characteristics of each website visited by the anonymous user of the predetermined group of websites. The computer system further comprises means for calculating an estimated user demographic profile of the anonymous user by using the first record of visits by the anonymous user and the one or more website profiles.

BRIEF DESCRIPTION OF THE DRAWINGS

These and other features will now be described with reference to the drawings summarized below. These drawings and the associated description are provided to illustrate various embodiments, and not to limit the scope of the invention.

FIG. 5 shows an example sorting plan file in accordance with certain embodiments described herein.

FIG. 7 shows an example processed list file in accordance with certain embodiments described herein.

FIG. 8 shows example demographic subgroups of demographic categories in accordance with certain embodiments described herein.

FIG. 10A shows an example sorted daily web traversal history file in accordance with certain embodiments described herein.

FIG. 10B shows an example "clean" sorted daily web traversal history file in accordance with certain embodiments described herein.

FIG. 12A shows the contents of a listing of websites skewed towards one or more age groups.

FIG. 12B shows the contents of a listing of websites skewed towards one gender or the other.

FIG. 13 shows an example skewed website traversal history file in accordance with certain embodiments described herein.

FIG. 14 shows an example user demographic assignment file in accordance with certain embodiments described herein.

FIG. 15 shows the estimated distribution of various demographic subgroups for various example websites as compared to the expected distribution on the Internet.

FIG. 16A shows an example daily website profile file in accordance with certain embodiments described herein.

FIG. 16B shows an aggregate website profile file for all Mondays during the period of November 1st to December 25th.

FIG. 17A shows an example website composition vector in accordance with certain embodiments described herein.

FIG. 17B shows a listing of the fields of each line of an example website composition file in accordance with certain embodiments described herein.

FIG. 17C shows a listing of the fields of an example daily website composition file in accordance with certain embodiments described herein.

FIG. 17D shows a portion of an example daily website composition file in accordance with certain embodiments described herein.

FIG. 17E shows a listing of the fields of an example hourly website composition file in accordance with certain embodiments described herein.

FIG. 18 shows a portion of an example user history file in accordance with certain embodiments described herein.

FIG. 19A shows an example user probability vector in accordance with certain embodiments described herein.

FIG. 19B shows a listing of the fields of an example user probability table in accordance with certain embodiments described herein.

FIG. 19C shows a portion of an example user probability table in accordance with certain embodiments described herein.

FIG. 20A shows a portion of an example user demographic table in accordance with certain embodiments described herein.

FIG. 20B shows one example set of demographic groups in accordance with certain embodiments described herein.

DETAILED DESCRIPTION

Certain embodiments described herein provide a system and method for demographically profiling anonymous users to websites having website demographic profiles. This demographic profiling of the anonymous users can provide information regarding the gender, age group, or other demographic categories of the individual anonymous users based on their web traversal data. For example, in certain embodiments, the correct gender information can be calculated for more than 97% of anonymous users, and determining the demographic subgroups of the anonymous users in other demographic categories can also be calculated. Certain embodiments described herein utilize the demographic profile of the anonymous user to present advertisements to the anonymous user with the advertisements tailored to members of one or more of the demographic subgroups of the anonymous user. For example, the advertisements can be ones designed to appeal to users having the anonymous user's demographic profile. By targeting users having specific demographic profiles, certain embodiments described herein advantageously remove inefficiencies out of the online media buying process and provide advertisers with optimal return on investment and give advertisers insight regarding the audience reached by their advertisements.

Certain embodiments described herein advantageously handle large amounts of data such that one day's worth of data corresponding to millions (e.g., 10 million) of anonymous users is processed within 3 to 6 hours. Certain embodiments described herein advantageously are run in automated mode every day and on remote servers. Thus, certain embodiments described herein run with minimal user interaction.

Figure 1:
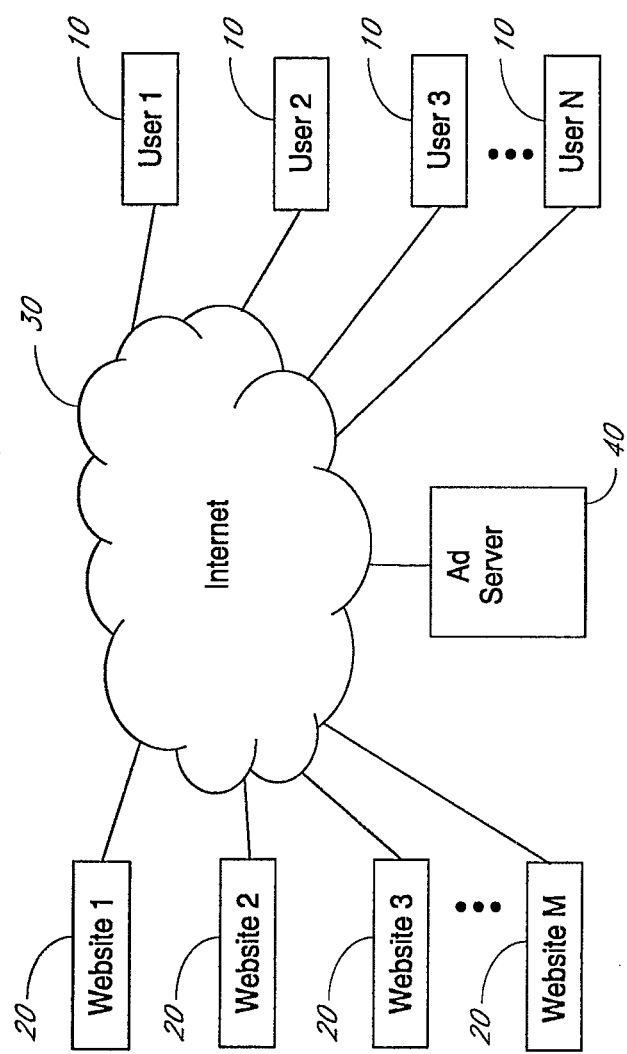
FIG. 1 schematically illustrates an example configuration in which certain embodiments described herein can be used.

FIG. 1 schematically illustrates an example configuration in which certain embodiments described herein can be used. A number of anonymous users use the web browser programs (e.g., Internet Explorer®, Firefox®, Safari®) installed on their computers 10 to access or visit a number of websites 20 via the Internet 30. These websites 20 each present information (e.g., primary content and/or advertisements) to the anonymous user visiting the website 20. As used herein, the term "anonymous user" has its broadest reasonable meaning, which includes users whose information regarding their identity or demographic characteristics has not previously been provided to the website 20 by the user or from other sources.

When an anonymous user visits a page of a website 20, besides sending the requested web page to the anonymous user's computer 10, the website 20 typically also includes advertisements. The website 20 can receive these advertisements from one or more advertisement databases or servers 40 in communication with the website 20 (e.g., via the Internet 30 or via a dedicated communication channel between the advertisement servers 40 and the website server). Upon a user visiting the website 20, the website 20 can send a request to the advertisement server 40 to transmit advertisement information (e.g., an image) and a link to another webpage with further information regarding the products or services being advertised. The advertisement information is presented (e.g., as a clickable image which links to a webpage with further information) as part of the website 20 displayed on the user's computer 10. If the user is interested in getting further information, the user can direct the user's computer 10 to access the link so that the user's browser visits the corresponding webpage. In addition, if the user wishes to conduct a transaction or otherwise interact with the corresponding webpage, the user can direct the user's computer 10 to do so. Typically, this access of the corresponding webpage takes place via the advertisement server 40. Thus, the advertisement server 40 can not only track the requests made by websites 20 for advertisements, but can also track whether the anonymous user "clicked-through" to the webpage corresponding to the displayed advertisement, and can track the user's subsequent actions (e.g., sale, registration, application, or any other action that the advertiser is trying to achieve with the advertisement).

In addition, the website 20 can place tracking information (e.g., in the form of a cookie) onto the anonymous user's computer 10 to aid in tracking the browsing history of the anonymous user 20. This information is made accessible to the website 20 by the anonymous user's computer 10 upon subsequent visits by the anonymous user to the website 20 (e.g., to keep track of the anonymous user's history of accessing the website 20).

Certain embodiments described herein include methods which are performed by computer hardware and/or software comprising one or more modules. The hardware used for certain embodiments described herein can take a wide variety of forms, including general-purpose computers, network servers, workstations, personal computers, mainframe computers and the like. The computers running the software will typically include one or more input devices, such as a mouse, trackball, touchpad, and/or keyboard, a display, and computer-readable memory media, such as random-access memory (RAM) integrated circuits and a hard-disk drive. It will be appreciated that one or more portions, or all of the software code may be remote from the user and, for example, resident on a network resource, such as a LAN server, Internet server, network storage device, etc. The software code which configures the hardware to perform in accordance with certain embodiments described herein is typically provided on a computer-readable medium, such as a CD-ROM. The software code may also be downloaded from a network server which is part of a local-area network (LAN) or a wide-area network (WAN), such as the Internet. Various computer languages, architectures, and configurations can be used to practice the various embodiments described herein. For example, certain embodiments described herein can be performed using a Java program comprising a plurality of modules running on a Unix or Linux platform. Certain embodiments described herein are performed by 32-bit machines which have limited random-access memory.

As described below, many of the intermediate results or files utilized in certain embodiments described herein are quite large. Therefore, in certain embodiments, the intermediate results or files are advantageously stored on a disk drive rather than random-access memory, and the method is divided into several Java class modules, where each module takes an input or an intermediate file and creates an intermediate file or final output file. In certain embodiments, the various files and tables described herein have comma separated value (CSV) format, while in certain other embodiments, other formats (e.g., XML) can be used. In certain embodiments, the fields of the various files and tables are placed in a predetermined order and the position of a field relative to the other fields is indicative of the type of information contained in the field.

Figure 2:
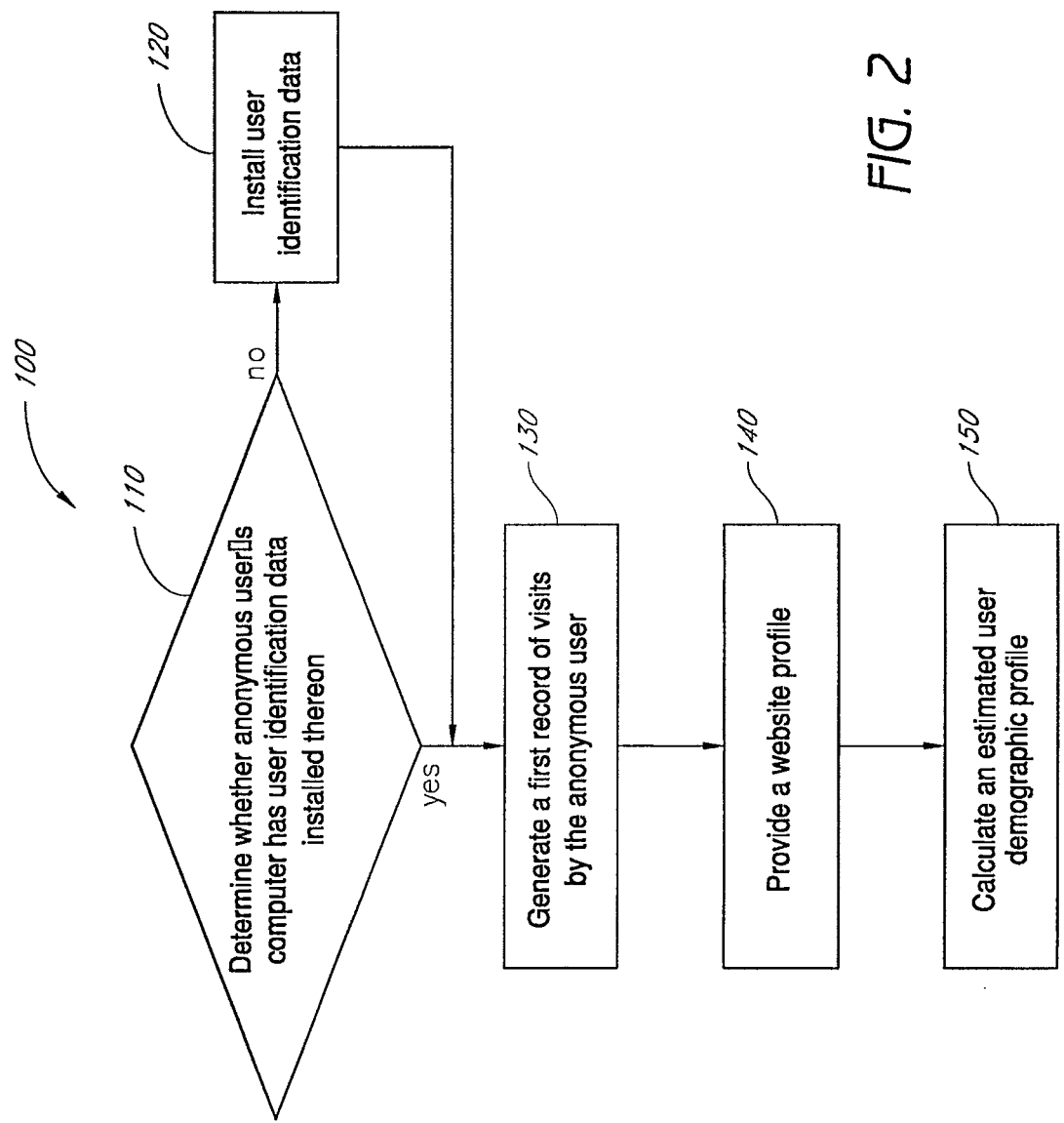
FIG. 2 is a flow diagram of an example method of determining a user demographic profile of an anonymous user of one or more websites of a predetermined group of websites in accordance with certain embodiments described herein.

FIG. 2 is a flow diagram of an example method 100 of determining a user demographic profile of an anonymous user that visits one or more websites 20 of a predetermined group of websites in accordance with certain embodiments described herein. In an operational block 110, the method 100 comprises determining whether an anonymous user's computer 10 has user identification data installed thereon. The determination of whether the anonymous user's computer 10 has the user identification data installed thereon is performed upon the anonymous user visiting a website 20 of the predetermined group of websites. The user identification data is unique to the anonymous user. In an operational block 120, the method 100 further comprises installing the user identification data on the anonymous user's computer 10 if the anonymous user's computer 10 does not have the user identification data installed thereon. In an operational block 130, the method 100 further comprises generating a first record of visits by the anonymous user to the websites 20 of the predetermined group of websites. In an operational block 140, the method 100 further comprises providing a website profile comprising demographic characteristics of each website 20 of the predetermined group of websites visited by the anonymous user. In an operational block 150, the method 100 further comprises calculating an estimated user demographic profile of the anonymous user by using the first record of visits by the anonymous user and the website profile.

In certain embodiments, the predetermined group of websites comprises a group of member, client, or partner websites which receive advertisement information from an advertisement server system which practices the method 100. The advertisement server system can comprise one or more advertisement servers and one or more data servers. In certain embodiments, one or more servers are used as both an advertisement server and a data server. In certain embodiments, a plurality of set up advertisement servers are configured so that any of the servers can adequately serve the request from any user. This configuration is chosen in certain embodiments to serve a large number of simultaneous requests from a large number of users on the Internet. These advertisement servers periodically interact with a database server to gather specific information about an advertisement to be served to a user based on the user's anonymous profile and other factors. Various configurations of databases and servers are compatible with certain embodiments described herein.

User Identification Data

In certain embodiments, determining whether the anonymous user's computer 10 has user identification data installed thereon comprises accessing a cookies file on the user's computer 10 and determining whether the cookie file contains a cookie having an expected format and comprising the user identification data. In certain embodiments, the user identification data comprises a cookie having between 15 and 20 bytes of data. As used herein, the term "cookie" has its broadest reasonable meaning, including but not limited to information sent by a server to a user's computer 10 via the web browser program, and which is sent back to the server via the web browser upon the web browser accessing the server again. Cookies in general are known in the art as a means for authenticating, tracking, and maintaining specific information regarding a user.

The user identification data of certain embodiments is solely an arbitrary identifier of the user's computer 10. In certain other embodiments, the user identification data can comprise information regarding the user, the user's computer, an internet service provider (ISP) through which the user is accessing the website 20, or an advertisement server which provides advertisements to websites being visited by the user. In certain embodiments, an advertisement server providing advertisements to websites being visited by the user has an IP address, and the user identification data has the IP address encoded therein. For example, for a user identification of "2111A0AA2899BA495," the string left after removing the first 11 characters is 9BA495 which is the IP address of the advertisement server in hexadecimal.

In certain embodiments, installing the user identification data on the anonymous user's computer 10 comprises creating a user identification file (e.g., a cookies file) on the user's computer 10 if one does not already exist, and placing the user identification data within this file (e.g., installing a cookie onto the anonymous user's computer 10). When the user identification file already exists, installing the user identification data on the anonymous user's computer 10 comprises placing the user identification data within this previously-existing file (e.g., installing a cookie onto the anonymous user's computer 10).

The determination of whether the user's computer 10 contains the user identification data and/or the installation of the user identification data on the user's computer can be done in certain embodiments by an advertisement server using techniques that are known to persons skilled in the art. The advertisement server of certain embodiments comprises one or more computers which access and/or store advertisement information and which transmit selected advertisement information to users in response to requests received by the advertisement server from the website 20. Upon the anonymous user visiting a member, client, or partner website 20 which receive advertisement information from the advertisement server, the advertisement server can detect the user identification data and/or install the user identification data on the anonymous user's computer 10. As used herein, the term "server" has its broadest reasonable meaning, including but not limited to a computer and/or a computer program that accepts requests from web browsers and that transmits responses (e.g., HTTP responses including data, HTML documents, linked objects such as images) to the web browser programs of the user's computers 10.

Visits by the Anonymous Users to Various Websites

Figure 3A:
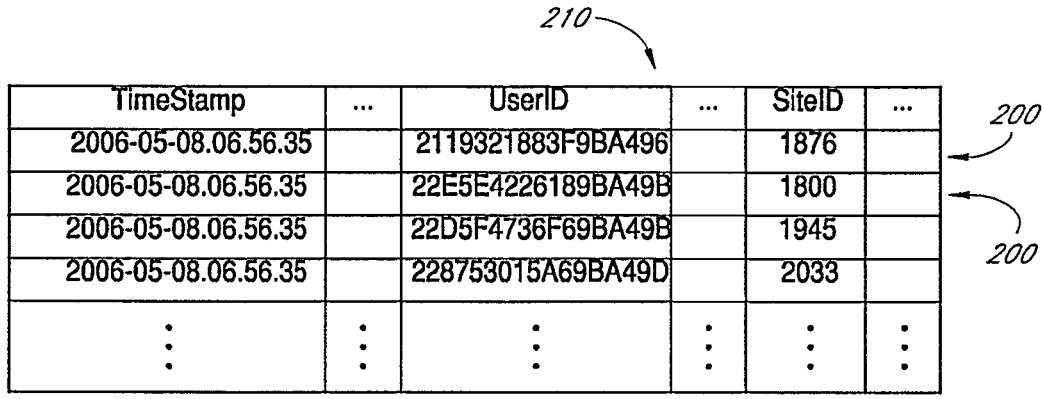
FIG. 3A shows an example log data file comprising a plurality of log data lines in accordance with certain embodiments described herein.

In certain embodiments, generating the first record of visits by the anonymous users to the websites 20 comprises sending the user identification data and the uniform resource locator (URL) address of the visited website 20 to a data server each time a user accesses one of the websites 20 of the plurality of websites. For example, in certain embodiments, the data server is an automated system which receives the user identification data and the URL address of the visited website 20 for a plurality of visits by anonymous users to websites 20 of the predetermined group of websites, records the data and the time corresponding to this event, and generates a log data line 200 corresponding to this event in a log data file 210. FIG. 3A shows an example log data file 210 comprising a plurality of log data lines 200 in accordance with certain embodiments described herein. In certain embodiments, a plurality of log data files 210 is generated by the data server. For example, in certain embodiments, each log data file 210 comprises about 3.3 MB to 3.5 MB of text in about 30000 log data lines 200, one log data file 210 is generated approximately every two to three minutes, and about 700-800 log data files 210 are generated each day. Therefore, in certain embodiments, the log data files 210 contain about 3.3 MB*800=2.6 GB of data containing about 800*30000=24 million log data lines 200. In certain embodiments, the total amount of data in the log data files 210 can be even larger (e.g., 100 million lines with 4000 MB of data per day).

As shown in FIG. 3A, in certain embodiments, each log data line 200 of the log data file 210 can comprise a plurality of fields. In certain such embodiments, these fields include the user identification data of the user (UserID), date and time information regarding the user's visit to the website 20 (TimeStamp), and the site identification data identifying the site visited by the user (SiteID). Each log data line 200 corresponds to a visit by user indicated by the UserID information visiting a website indicated by the SiteID information on the date and time indicated by the TimeStamp information. In certain embodiments, the date and time information can instead be included in two separate fields: a date field and a hour field (e.g., 1-24). In certain embodiments, the log data lines 200 comprises other fields (e.g., IP address of the user, number of clicks, action taken by the user during the visit, country in which the user is located, state or other sublocation of the user) which can be used in certain embodiments or can be ignored in certain other embodiments.

In certain embodiments, the log data files 210 are transmitted from the data server to another server in which the log data files 210 are processed. For example, in certain embodiments, the log data files 210 can be sorted or can be filtered or "cleaned" to remove unused or irrelevant data fields. In certain such embodiments, the log data files 210 are transmitted in a compressed format (e.g., as a ".gz" file having a size of about 800 KB or larger).

In certain embodiments, one log data file 210 having a size of about 3.5 MB and about 30000 lines is received every two to three minutes. These log data files 210 in certain embodiments are saved and processed (e.g., filtered, sorted) at regular intervals (e.g., every 12 or 24 hours). For example, in certain embodiments, the log data lines 200 of the log data files 210 are processed by removal of all the fields except UserID, SiteID, TimeStamp, and any other fields of interest (e.g., Clicks), and these processed data lines are grouped together in a total log data file 212.

Figure 3B:
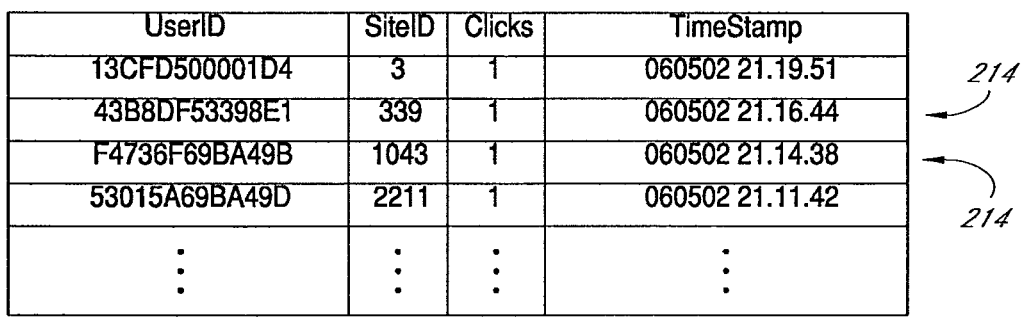
FIG. 3B shows an example total log data file in accordance with certain embodiments described herein.

FIG. 3B shows an example total log data file 212 with a plurality of lines 214 in accordance with certain embodiments described herein. In certain embodiments, this total log data file 212 is in CSV format, with a first line comprising header information and the subsequent lines comprising data lines. The total log data file 212 of certain embodiments is an intermediate file stored locally, and is unneeded once the method 100 is over. In certain embodiments, the number of lines 214 of the total log data file 212 is between 20 million and 50 million lines and the size of the total log data file 212 is between 1.5 GB and 3 GB. Other numbers of lines and sizes are also compatible with certain embodiments described herein.

In certain embodiments, the log data lines 200 corresponding to a given user may be distributed across multiple log data files 210 and scattered among lines 214 across various portions of the total log data file 212. For example, the log data lines 200 for a given user may be distributed among 800 log data files 210 having 8 GB of data. The lines 214 of the total log data file 212 in certain embodiments are advantageously sorted to aggregate the lines 214 corresponding to the same user together. In certain embodiments, the total log data file 212 is sorted by the UserID field. While Unix has a built-in sort utility, it fails to sort files larger than about 200 MB. Typical processes developed in C, Perl, or Java using ArrayList, HashMap, or TreeMap objects can only sort files up to 400 MB to 700 MB. Certain embodiments described herein utilize a sorting process which can sort up to 8 GB text files.

Figure 4:
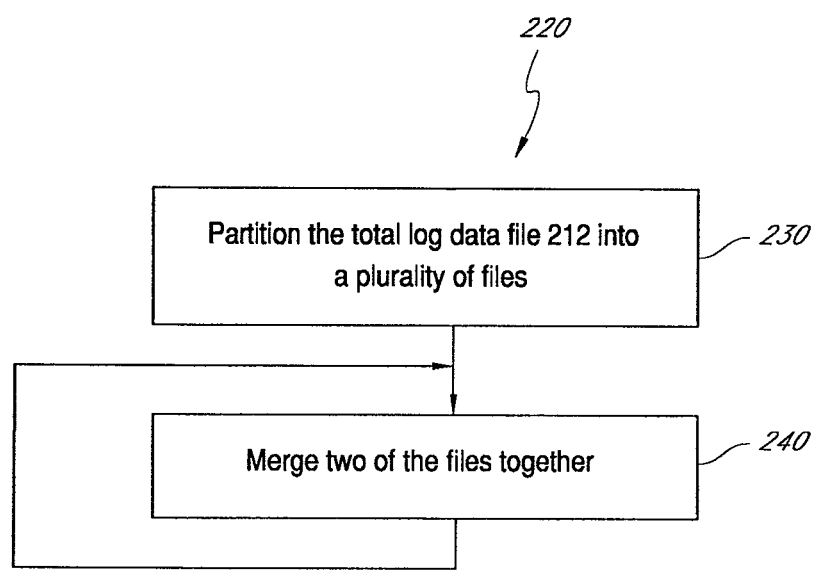
FIG. 4 is a flowchart of an example method for sorting the lines of the total log data file in accordance with certain embodiments described herein.

FIG. 4 is a flowchart of an example method 220 for sorting the lines 214 of the total log data file 212 in accordance with certain embodiments described herein. In an operational block 230, the total log data file 212 is partitioned into a predetermined number (e.g., 64) of separate files which are each sorted in memory. In an operational block 240, two of the files are merged together into one sorted file. The merge process of the operational block 240 is repeated for subsequent pairs of files until all of the files have been merged into one large sorted total log data file 250. For example, for a total log data file 212 partitioned into 64 files, the process of the operational block 240 is repeated 63 times. For files of X MB in size, after a first round of merge steps, there will be 32 files each having 2X MB of data. After a second round of merge steps, there will be 16 files each having 4X MB of data, and so on. In certain embodiments, the sorting of the lines is performed while merging the files together, thereby improving performance by reducing processing time (e.g., by an order of magnitude).

In certain embodiments, a sorting plan file is used, wherein each line of the sorting plan file corresponds to one merge step. FIG. 5 shows an example sorting plan file 252 in accordance with certain embodiments described herein. In certain embodiments, the sorting plan file 252 has one header line and a plurality of step lines with seven fields each. The "Step" field shown in FIG. 5 corresponds to the step number, the "InputFile1" and "InputFile2" fields correspond to the names of the two files to be merged, the "Dir1" field corresponds to the directory where InputFile1 is stored, the "Dir2" field corresponds to the directory where InputFile2 is stored, the "OutputFile" field corresponds to the name of the output file of the merge step, and the "Dir3" field corresponds to the directory where OutputFile is stored. For example, the first line indicates that File01.001 in directory A is merged with File01.023 in directory B, with the resultant File02.001 in directory C.

In certain embodiments, each of the files to be merged and sorted is less than about 500 MB in size, and each file is small enough that it can be sorted by an ordinary Java process. The sorting process of certain embodiments is then performed in the following six rounds:

Round 0: Provide 64 files of the same size (e.g., less than 500 MB) and sort each small file using an ordinary Java process (e.g., ArrayList);

Round 1: Merge the 64 sorted files, two files at a time, into 32 files; the merging ensures that each of the 32 output files are also sorted;

Round 2: Merge the 32 sorted files, two files at a time, into 16 sorted files;

Round 3: Merge the 16 sorted files, two files at a time, into 8 sorted files;

Round 4: Merge the 8 sorted files, two files at a time, into 4 sorted files;

Round 5: Merge the 4 sorted files, two files at a time, into 2 sorted files; and Round 6: Merge the 2 sorted files into 1 sorted file.

In certain embodiments, each merging step utilizes two source files, and one destination file, and the merging step is performed quickly when all three files are on three different disks or if the disk has several heads. If the disk access is slow, the three directories can be on different disks. If the disk access is fast and has several heads, the three directories can be on the same disk. In addition, the overall speed of the merge step can depend on where the initial 64 small files were placed, and the sequence in which the files are merged.

For example, a sorting plan can have 32 files stored on Directory A merged with 32 files stored on Directory B, with the resultant 32 files stored on Directory C. However, unless 16 of these 32 files on Directory C are moved to either Directory A or Directory B, subsequent merge steps will be extremely slow. Thus, such a sorting plan would have significant overhead due to copying 16 files before Round 2 begins. For example, if the total data to be sorted is 8 GB, the amount of copying to be done would be about 4 GB per round. For the six rounds, the total copying would be about 24 GB. If the total data to be sorted is 32 GB, total re-copying of files would be 96 GB which, at five minutes per GB, results in an overhead of about 480 minutes, or 8 hours.

The example sorting plan file 252 shown in FIG. 5 is compatible with certain embodiments described herein which advantageously reduces such copying of the intermediate merged files. In certain embodiments, this reduction of the copying can substantially eliminate the copying of the intermediate merged files, and can therefore improve the overall time of the sorting process by about 50% as compared to other sorting schemes. In certain embodiments, the sorting method advantageously allows up to about 32 GB of data to be sorted on a computer with 4 GB or random-access memory (RAM). By ensuring that the merging routine is executed in the desired order, the merging routine of certain embodiments results in a resultant sorted file.

Figure 3C:
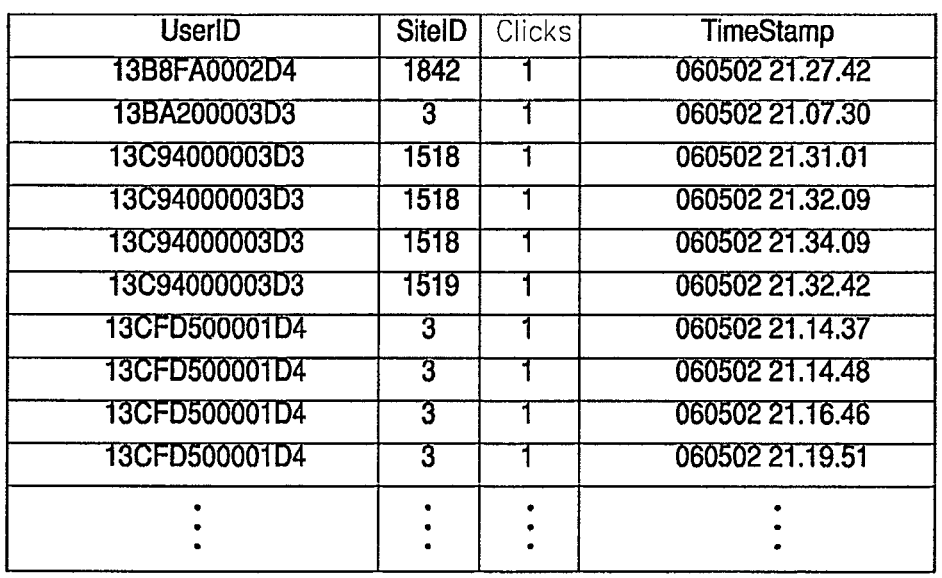
FIG. 3C shows an example sorted total log data file in accordance with certain embodiments described herein.

FIG. 3C shows an example sorted total log data file 254 in accordance with certain embodiments described herein. The sorted total log data file 254 is generated by sorting the lines 214 of the total log data file 212, and in certain embodiments, has the same fields as the total log data file 212, but the data lines are sorted and aggregated by UserID. The sorted total log data file 254 of certain embodiments serves as the first record of visits by the anonymous users to the websites 20 of the predetermined group of websites generated in the operational block 130 of the method 100. The sorted total log data file 254 of certain embodiments provides a list of websites 20 each user visited, along with the number of times each user visited the website 20 and the times these visits occurred.

In certain embodiments, the log data files 210 are continually being received and processed, so a procedure is advantageously used to keep track of which log data files 210 have already been processed and which log data files 210 have not yet been processed. In certain embodiments, a datastamp can be contained in the filename of the log data file 210 and/or in the file creation date of the log data file 210 as given by the operating system, however both of these options have drawbacks. For example, a log data file 210 with an older datestamp in its filename can sometimes be received after a log data file 210 with a newer datestamp. Also, when log data files 210 are restored from backup, or some similar event, the file creation date may be changed.

Figure 6:
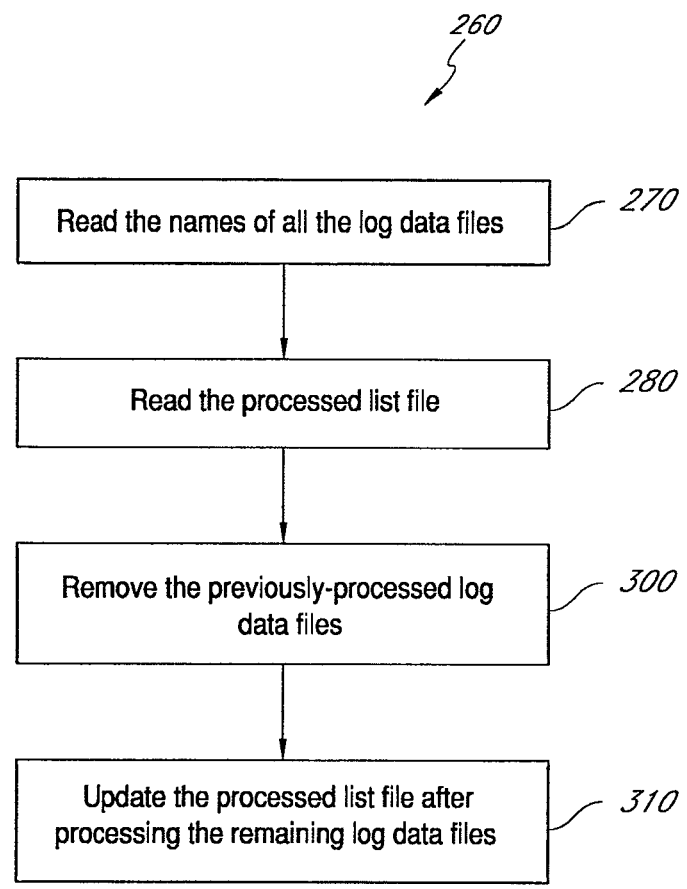
FIG. 6 is a flowchart of an example process for processing the log data files in accordance with certain embodiments described herein.

FIG. 6 is a flowchart of an example process 260 for processing the log data files 210 in accordance with certain embodiments described herein. In certain embodiments, this process 260 is part of the generation of the first record of visits in the operational block 130 of the method 100. In an operational block 270, the process 260 comprises reading the names of all the log data files 210 in the directory (e.g., log dump directory) in which the log data files 210 are stored. In an operational block 280, a processed list file 290 is read, the processed list file 290 containing the names of the log data files 210 which have previously been processed. In an operational block 300, the log data files 210 listed in the processed list file 290 are removed from the directory, thereby leaving only those log data files 210 which have not yet been processed. In an operational block 310, after processing these log data files 210, the processed list file 290 is updated to include the names of these newly processed log data files 210.

FIG. 7 shows an example processed list file 290 in accordance with certain embodiments described herein. The processed list file 290 has a header line with field names, and a plurality of data lines containing the names of the processed log data files 210 and the date and time when the log data file 210 was processed.

In certain embodiments in which the method 100 is performed using a Unix or Unix-like operating system (e.g., Linux), the total log data file 212 can be created by a process invoked from cron at a scheduled time each day (e.g., 8:00 AM). For example, a Java module reads the names of all the log data files 210 in the directory (e.g., log dump directory) in which the log data files 210 are stored. The module then removes the log data files 210 which are listed in the processed list file 290, leaving only the log data files 210 which have not yet been processed. For each log data file 210 to be processed, the module uncompresses the log data file 210 into a working directory and reads the log data file 210 line-by-line, tokenizing the line, concatanating the fields UserID, Timestamp, SiteID, and any other desired fields, and appends the line into the total log data file 212. After merging all of the log data lines 200 into the total log data file 212, the module sorts the total log data file 212 as described above to create the sorted total log data file 254. In certain embodiments, about one to ten resultant sorted files are created each day, each having about 5 to 10 million lines in CSV format. The sorted total log data file 254 of certain embodiments contains the record of visits by the anonymous users to the websites 20 which is subsequently used in the determination of the demographic profiles of the anonymous users.

Website Profile

In certain embodiments, a website profile comprising demographic characteristics of each website 20 of the predetermined group of websites can be provided in various ways in the operational block 140 of the method 100. The demographic characteristics of a website 20 are expressed in the website profile of certain embodiments as the probabilities that a random user visiting the website 20 is in one or more demographic subgroups of one or more demographic categories. For example, in certain embodiments, the demographic categories can include, but are not limited to, age, gender, education level, ethnicity, income level, type of occupation, marital status, household size, presence, number, and ages of children in the household, and number and types of pets in the household. FIG. 8 shows example demographic subgroups of some demographic categories (e.g., gender, age, annual income, ethnicity, household size, education level) in accordance with certain embodiments described herein. Other demographic subgroups are also compatible with certain embodiments described herein.

Figure 9:
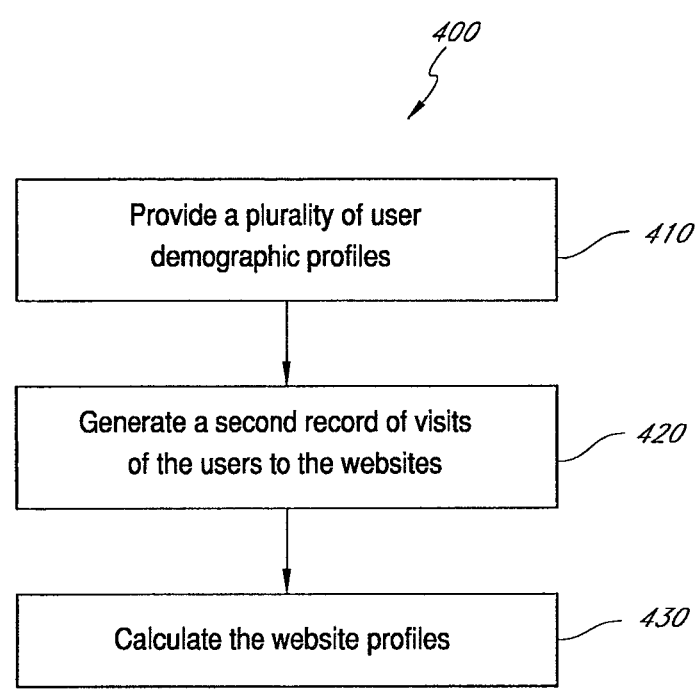
FIG. 9 is a flowchart of an example process for providing the website profile in accordance with certain embodiments described herein.

FIG. 9 is a flowchart of an example process 400 for providing the website profile in accordance with certain embodiments described herein. In an operational block 410, the process 400 comprises providing a plurality of user demographic profiles for a predetermined group of users. In an operational block 420, the process 400 further comprises generating a second record of visits by the predetermined group of users to the predetermined group of websites. In an operational block 430, the process 400 further comprises calculating the website profile using the plurality of user demographic profiles and the second record of visits. The user demographic profiles of certain embodiments comprise information regarding the demographic subgroups in which the user is a member.

Visits by Non-Anonymous Users to Derive Website Profiles

In certain embodiments, the users of the predetermined group of users are non-anonymous and providing the plurality of user demographic profiles in the operational block 410 comprises providing information obtained from the users of the predetermined group of users regarding the demographic profiles of the users of the predetermined group of users. For example, the users of the predetermined group of users can be users that have voluntarily submitted their user demographic profiles, so the users are therefore non-anonymous. Such users may provide their information in response to a survey, registration procedure, or in exchange for access or something of value to the user (e.g., computer security software, internet data storage, virus scanning, chances to win cash and prizes). In certain embodiments, the non-anonymous users may also allow their web browsing history to be monitored and recorded as well. Thus, in certain such embodiments, providing the plurality of user demographic profiles and the second record of visits by the non-anonymous users does not require substantial calculations or further procedures.

However, the user demographic profiles provided by the users themselves might not be sufficiently accurate. According to industry estimates, up to 36% of registrants submit inaccurate information on their registration forms. A recent analysis has also shown that about 86% of registered users do not disclose their gender information while filling a registration form, and about 25% of users give incorrect gender information, with about 22% of men giving incorrect gender information and about 35% of women giving incorrect gender information. In addition, the pool of users voluntarily submitting their user demographic profiles is typically only a small fraction of the total pool of users, and reliance on such a small sampling to approximate the total pool of users can result in inaccuracies as well.

Visits by Anonymous Users to Derive Website Profiles

In certain embodiments, the users of the predetermined group of users are anonymous and providing the plurality of user demographic profiles in the operational block 410 comprises assigning at least some of the users of the predetermined group of users to one or more demographic subgroups based on known or derived demographic profiles of the websites visited by these users. In certain embodiments, the assigned users are selected from web traversal history files obtained from internet service providers (ISPs). These web traversal history files contain lists of users and the URLs of the websites visited by the listed users. In certain embodiments, each web traversal history file received from an ISP contains the web traversal history of 600,000 or more users of the ISP for that day, and 60 to 200 web traversal history files can be received from the various ISPs each day.

Web traversal history files can be received from the ISPs on a regular basis (e.g., daily) and can have the date on which the file was prepared by the ISP and an identification of the ISP in the filename. Sizes for the web traversal history files can be in the range between 8 GB to 10 GB, although other sizes are also compatible with certain embodiments described herein. In certain embodiments, each web traversal history file contains web traversal data of about 600,000 users with about 70 million lines (about 120 lines per user), with the lines corresponding to a given website scattered throughout the web traversal history file.

The web traversal history files of certain embodiments include a plurality of lines each having a plurality of fields. In certain embodiments, only some of these fields are used in the subsequent analysis, and some of these fields are ignored. The fields used in the subsequent analysis can include, but are not limited to: UserID, EpochTime, Delta, and URL. UserID is a unique identification string provided by the ISP to identify the user, and URL is the URL as sent by the user's computer to the ISP. EpochTime is the number of seconds that had elapsed between the moment the user first accessed the URL and a predetermined moment (e.g., Jan. 1, 1970 midnight, which is used as an industry standard). In certain embodiments, the EpochTime is set by the user's computer, so it may be incorrect. In certain such embodiments, subsequent analysis is performed assuming that the EpochTime provides a correct time and an incorrect date. Delta is the amount of time that the user spent on the website identified by the URL field.

In certain embodiments, a daily web traversal history file is created which contains all the data of the individual web traversal history files received from the ISPs for a given day. Such a daily web traversal history file can be created once a day and can be given a filename which includes the date corresponding to the data therein. In certain embodiments in which the individual web traversal history files do not contain the UserID, EpochTime, Delta, and URL fields in the expected order, these fields can be placed in the expected order in the daily web traversal history file. In certain embodiments, the daily web traversal history file can be used to create a sorted daily web traversal history file 440 in which the lines are sorted by UserID to aggregate the lines corresponding to a particular UserID together. Such a sorted daily web traversal history file 440 has the same number of lines and is of the same size as the daily web traversal history file, and can be given a filename which includes the date corresponding to the data therein.

In certain embodiments, the sorted daily web traversal history file 440 is created using a similar sorting scheme as described above with regard to the sorted total log data file 254. Such a sorting scheme, as used in certain embodiments, advantageously improves the overall time of the sorting process by about 50% as compared to other sorting schemes. In certain embodiments, the sorting method advantageously allows up to about 32 GB of data to be sorted on a computer with 4 GB or random-access memory (RAM). By ensuring that the merging routine is executed in the desired order, the merging routine of certain embodiments results in a resultant sorted file.

FIG. 10A shows an example sorted daily web traversal history file 440 in accordance with certain embodiments described herein. The entries of the unused fields (e.g., in Col2, Col3, Col4) are shown in FIG. 10A as Xs. In certain embodiments, the sorted daily web traversal history file 440 is filtered to remove unused data, and a "clean" version of the sorted daily web traversal history file is created. FIG. 10B shows an example "clean" sorted daily web traversal history file 442 in accordance with certain embodiments described herein. The lines of the "clean" file 442 contain the UserID, EpochTime, Delta, and WebsiteName fields. The data in the UserID, EpochTime, and Delta fields in the "clean" file 442 are unchanged from the data in the corresponding fields in the sorted daily web traversal history file 440. The data in the WebsiteName field is derived from the data in the URL field of the sorted daily web traversal history file 440, but much of the data in the URL field is unused in certain embodiments described herein, so it is removed to create the WebsiteName field. For example, the prefixes (e.g., "http://", "www", "www1", etc.), spaces, and the portion after the first single hash ("/") are removed, thereby leaving only the website name. In certain embodiments, the "clean" file 442 is about 2.5 GB in size, which can be about 40% of the size of the daily web traversal history file 440.

Using Skewed Websites to Derive Profiled User Demographic Profiles

Figure 11:
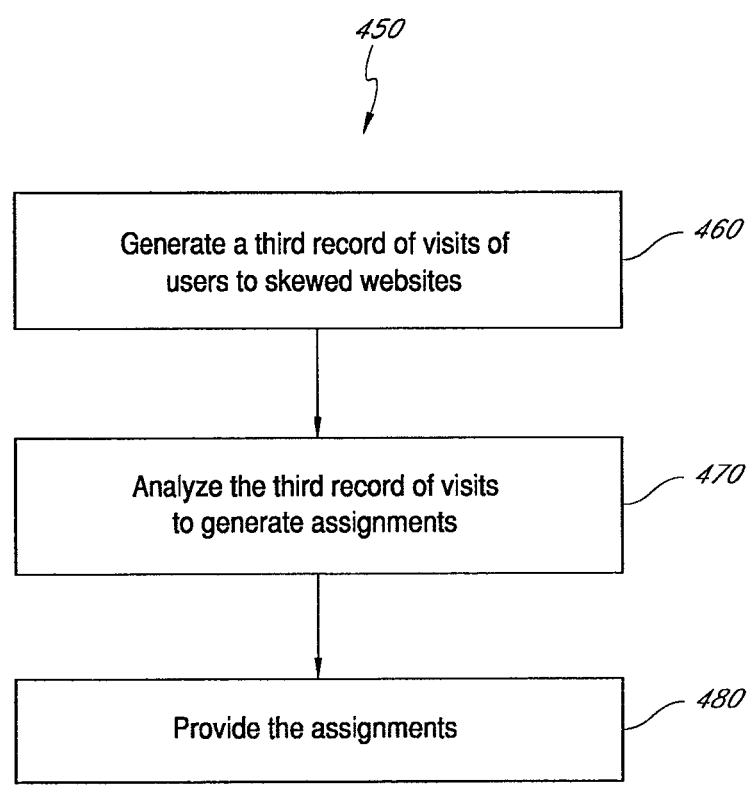
FIG. 11 is a flowchart of an example process for assigning the users of the predetermined group of users to one or more demographic subgroups in accordance with certain embodiments described herein.

FIG. 11 is a flowchart of an example process 450 for assigning the users of the predetermined group of users to one or more demographic subgroups in accordance with certain embodiments described herein. In an operational block 460, the process 450 comprises generating a third record of visits by the predetermined group of users to a predetermined group of skewed websites. Each skewed website has a known website profile skewed towards at least one demographic subgroup of the one or more demographic categories. In an operational block 470, the process 450 further comprises analyzing the third record of visits to generate assignments of at least some of the users of the predetermined group of users to one or more demographic subgroups of the one or more demographic categories. In an operational block 480, the process 450 further comprises providing the assignments of the at least some of the users of the predetermined group of users to the one or more demographic subgroups of the one or more demographic categories.

In certain embodiments, the website profile of a skewed website comprises a plurality of probabilities that a random user visiting the skewed website is a member of one or more demographic subgroups. For example, FIG. 12A shows the contents of a listing 490 of websites (e.g., between 200 and 600 websites) skewed towards one or more age groups (labeled AgeGroup 1 to AgeGroup7). For example, as shown in FIG. 12A, the probability that a random user visiting the "littleswimmers.com" website is in AgeGroup1 is 0%, the probability that the random user is in AgeGroup2 is 17.27%, the probability that the random user is in AgeGroup3 is 55.4%, and so forth. FIG. 12B shows the contents of a listing 492 of websites skewed towards one gender or the other. For example, as shown in FIG. 12B, the probability that a random user visiting the "homecafe.com" website is male is 5.24%.

In certain embodiments, a ethnicity-skewed website is one in which the traffic on the website is substantially exclusively from ethnic subgroup. For example, the website profile of the website "foro.univision.com" has the following ditribution: Caucasian 0.093; African-American 0.010; Asian 0.006; and Hispanic 0.891. Therefore, visits by a user to the website "foro.univision.com" can be used in certain embodiments as an indication that the user is Hispanic. In certain embodiments, online population distributions of demographic groups as provided by sources such as comScore, iMedia Connection, eMarketer, etc. can be used as well to assign users into various demographic subgroups based on their web traversal history data.

As used herein, the term "skewed website" has its broadest reasonable meaning, including but not limited to, a website having a significantly higher probability of a random user of the website being in one demographic subgroup than in another demographic subgroup of the same demographic category. For example, in certain embodiments, a website is considered to be gender-skewed if one of the two genders has a probability greater or equal to 80%. In certain embodiments, a website is considered to be skewed towards a particular demographic subgroup if the probability of the user being a member of the subgroup is higher than the probability of a random Internet user being in the subgroup.

In certain embodiments, the probabilities of the website profiles of the skewed websites are obtained from an internet marketing research company (e.g., comScore, Inc. of Reston, Virgina or Alexa Internet of San Francisco, Calif.) that provides marketing data and services to companies or by manual research. Such companies maintain a group of users who have monitoring software (e.g., PermissionResearch or OpinionSquare) installed on their computers, and the Internet browsing histories of these users are tracked to determine the website profiles of the skewed websites.

In certain embodiments, generating the third record of visits by the predetermined group of users to a predetermined group of skewed websites in the operational block 460 comprises analyzing the "clean" sorted daily web traversal history file 442 to extract data regarding visits by at least some of the users to skewed websites and creating a skewed website traversal history file 500. FIG. 13 shows an example skewed website traversal history file 500 in accordance with certain embodiments described herein. Each line of the skewed website traversal history file 500 of certain embodiments corresponds to a unique UserID and contains fields with data regarding the visits of the particular user to age-skewed and gender-skewed websites. Other forms of the skewed website traversal history file 500 (e.g., containing data regarding visits to websites skewed with regard to other demographic categories) are also compatible with certain embodiments described herein.

As shown in FIG. 13, in certain embodiments, data for the following fields are provided for each user (identified by the unique UserID):

TSAgeGrp1-7: Time spent by the user on websites skewed for males in AgeGroup1 through AgeGroup7;

TSAgeSkewed: Total time spent by the user on age-skewed websites;

TSMale: Total time spent by the user on male-skewed websites;

TSFemale: Total time spent by the user on female-skewed websites;

nLines: Number of lines in the "clean" sorted daily web traversal history file 442 for the user corresponding to gender-skewed websites;

nLineMale: Number of lines in the "clean" sorted daily web traversal history file 442 that correspond to visits by the user to male-skewed websites;

nLineFemale: Number of lines in the "clean" sorted daily web traversal history file 442 that correspond to visits by the user to female-skewed websites;

nLinesAge: Number of lines in the "clean" sorted daily web traversal history file 442 that correspond to visits by the user to age-skewed websites.

While these fields are shown in FIG. 13 to be in two separate lines for each UserID, in certain embodiments, each user is represented by a single line. The skewed website traversal history file 500 of certain embodiments has a size of about 50 MB and contains data regarding 600,000 to 700,000 users. In certain embodiments, these fields are used to calculate the probabilities of a user belonging to a particular demographic category.

In certain embodiments, generating the third record of visits in the operational block 460 further comprises creating an aggregate skewed website traversal history file. This aggregate skewed website traversal history file can contain the aggregated data of all the users in the skewed website traversal history files 500 received daily from the ISPs over a predetermined period of time (e.g., over the past 180 days). In certain embodiments in which 100-120 ISPs are providing website traversal history files, the aggregate skewed website traversal history file can contain the aggregate data for about 2.4 million UserIDs and can have a size of about 150 MB. The lines and fields of the aggregate skewed website traversal history file can be similar to those of the skewed website traversal history file 500.

In certain embodiments, analyzing the third record of visits in the operational block 470 comprises analyzing the aggregate skewed website traversal history file to generate assignments of at least some of the users to one or more demographic subgroups of the one or more demographic categories. In certain embodiments, the users that are the subject of these assignments (the profiled users) are selected to be those users with website traversal histories satisfying predetermined criteria. In certain embodiments, the profiled users can be selected, at least in part, to be those users that have spent at least a predetermined amount of time on skewed websites. For example, in certain embodiments, if a user has spent less than 600 seconds on gender-skewed websites and less than 600 seconds on age-skewed websites, the user is not a profiled user and is ignored at this stage of the analysis. In certain embodiments, only visits that are greater than a predetermined threshold (e.g., 20 seconds) in length are considered for further analysis since visits shorter than the threshold might be due to a pop-up or indicative of lack of interest by the user. In certain embodiments, if a user visited a skewed website only on one day, the visit is not used for profiling, unless the visit was longer than a predetermined period of time (e.g., 40 seconds).

In certain embodiments, the profiled users are selected, at least in part, from the total list of users by identifying users who actively access the web with sufficient activity on a regular basis. In certain embodiments, a stable user is defined as one who is active at least once a week in a sample data of four consecutive weeks. The process of identifying a set of stable users can be executed on a regular basis. For example, the set of stable users can be identified weekly for a four-week window on a rolling basis. For every window of four weeks, the remaining processes described herein can be executed for the set of stable users identified in this window. In certain embodiments, the set of stable users is identified to facilitate demographic analysis at day and day-part (e.g., hourly) levels.

The demographics (e.g., age group and gender) of the profiled users are estimated using the time spent by the users on a skewed website and the skewness of the website for a particular demography. In certain embodiments, the probability of a user belonging to a particular demographic subgroup of one or more demographic categories is calculated using a weighted average formula:

$$GProbUser=\Sigma(TSG*GProbSite)/\Sigma(\text{Time Spent on all skewed sites}), \quad (1)$$

where GProbUser is the probability of the user being in the particular demographic subgroup G, TSG is the time spent by the user on the skewed website for the demographic subgroup G, and GProbSite is the probability of the particular demographic subgroup for the skewed website. Similarly, in certain embodiments, the number of visits by the user to skewed websites, as recorded by the number of lines in the aggregate skewed website traversal history file, can be used to calculate probabilities of the user being a member of one or more demographic subgroups. In certain embodiments, both the time spent by a user and the number of visits by a user to the skewed websites can be used to calculate the probabilities of the user being a member of one or more demographic subgroups.

In certain embodiments, this calculation is performed on a regular basis using newer web traversal history data of the users. The probabilities for a given user appearing in different web traversal history files are aggregated together in certain embodiments. In certain embodiments, the aggregate probabilities are generated using the following formula:

$$NCumProb=(CumProb*AvgTS*(N-1)+(NewProb*NewTS))/(AvgTS*(N-1)+NewTS), \quad (2)$$

where N is the total number of web traversal history files in which the user is present, CumProb is the cumulative probability from the previous web traversal history files, AvgTS is the average time spent by the user on skewed websites in the previous web traversal history files, NewProb is the probability calculated from the latest web traversal history file, NewTS is the time spent by the user on skewed websites in the latest web traversal history file, NcumProb is the aggregate probability incorporating the results from all of the web traversal history files, and NAvgTS is the average time spent by the user on skewed websites for all of the web traversal history files, and is equal to $(AvgTS*(N-1)+NewTS)/N$.

The output of this calculation for the various demographic subgroups provides an estimate of the demography of the profiled user with reasonable certainty. In certain embodiments, this estimate is used to generate an assignment of the profiled user to one or more demographic subgroups. For example, if the probability of a user belonging to a particular demographic subgroup is greater than a predetermined threshold, then the user can be assigned to that demographic subgroup, thereby becoming a profiled user. The threshold for each demographic subgroup can be set by a trade-off between accurate demographic estimation and profiling a large number of users. In certain embodiments, the user is assigned to a gender subgroup (e.g., male or female) if the probability of the user being a member of the subgroup is greater than 80%. In certain embodiments, the user is assigned to an age group subgroup (e.g., 0-17, 18-24, 25-34, 35-44, 45-64, 65+) if the probability of the user being a member of the subgroup is greater than 55%. In certain embodiments, the user is assigned to an ethnicity subgroup (e.g., Caucasian, African American, Asian American, Hispanic) if the probability of the user being a member of the subgroup is greater than 80%. In certain embodiments, the user is assigned to an income level subgroup if the probability of the user being a member of the subgroup is greater than 55%. In certain embodiments, the user is assigned to an education level subgroup if the probability of the user being a member of the subgroup is greater than 55%. In certain embodiments, the user is assigned to a presence of children subgroup if the probability of the user being a member of the subgroup is greater than 80%. Other probability thresholds for these and other demographic categories are also compatible with certain embodiments described herein.

For example, each of 120 web traversal history files can contain the web traversal history of about 600,000 users per day, and all the web traversal history files together can contain about 2,000,000 distinct users. Assume that 100 websites have skewed website profiles with regard to gender (e.g., websites W001 to W040 are male-specific and websites W041 to W100 are female-specific). Out of the 2,000,000 users listed in the web traversal history files, if there are about 100,000 users that spend more than a predetermined threshold amount of time per day on average on websites W001 to W100 with more than 75% of this time spent on websites W001 to W040, then these 100,000 users are most likely male users. Similarly, out of the 2,000,000 users listed in the web traversal history files, if there are about 60,000 users that spend more than a predetermined threshold amount of time per day on average on websites W001 to W100 with 75% of this time spent on websites W041 to W100, then these 60,000 users are most likely female users. Thus, the genders of 160,000 users of the total 2,000,000 users have been estimated with reasonable accuracy and these profiled users can be assigned to their particular gender subgroups. For users who have spent less than the predetermined threshold amount of time per day on average on the gender-skewed websites, or have spent less than 75% of their time on gender-skewed websites on either male- or female-skewed websites, then the gender of the user remains unassigned.

Similarly, for a user that spends more than a predetermined threshold amount of time per day on average on age-skewed websites with more than 40% of the user's time spent on websites skewed towards a particular age subgroup, then the profiled user is estimated to be a member of that age subgroup. For users who have spent less than the predetermined threshold amount of time per day on average on the age-skewed websites, or have spent less than 40% of their time on age-skewed websites on any one of the age-skewed websites, then the age group of the user remains unassigned.

In certain embodiments, some websites are identified as being skewed with respect to ethnicity. Various ethnic subgroups have dedicated portals and the fact that a user accesses one of these portals can be used to identify the user as a member of the ethnic subgroup. For example, if a user accesses an ethnicity-skewed website for more than a predetermined amount of time (e.g., 20 seconds to eliminate popup issues), then the user can be assigned that ethnicity with a predetermined probability (e.g., 0.80). In certain embodiments in which the user belongs to more than one ethnicity subgroup, the web traversal history of the user is analyzed to determine if the user has visited websites skewed towards one ethnicity subgroup more than others, and the user is assigned to the ethnicity of the most-visited ethnicity-skewed websites.

FIG. 14 shows an example user demographic assignment file 510 in which these assignments are expressed in accordance with certain embodiments described herein. The user demographic assignment file 510 contains one line per profiled user. Each line comprises a plurality of fields corresponding to the assigned demographic subgroups of the profiled user. As shown in FIG. 14, the gender field can have three different values: "M" denotes a user that has been predicted or assigned to be male; "F" denotes a user that has been predicted or assigned to be female; and "-" denotes a user for which the gender was not predicted or assigned (e.g., the user spent too little time web browsing and/or too little time on the gender-skewed websites). As shown in FIG. 14, the age group field can have eight different values: "1" through "7" denote a user that has been predicted or assigned to AgeGroup1 through AgeGroup7, respectively; and "−1" denotes a user for which the age group was not predicted or assigned (e.g., the user spent too little time web browsing and/or too little time on the age-skewed websites). In certain other embodiments, at least some of the profiled users can be predicted or assigned to be members of subgroups of other demographic categories as well. In certain embodiments, at least some of the profiled users can be predicted or assigned to be members of subgroups of multiple demographic categories (e.g., predicted or assigned to be an African-American male with an annual income greater than $150,000).

Using Profiled Users to Obtain Website Profiles

In certain embodiments, the user demographic profiles of the profiled users can be used to calculate the website profiles of other websites beyond the skewed websites discussed above. Certain embodiments described below focus on using the gender and age group assignments of the profiled users to determine the gender and the age group profiles of the websites. However, other demographic categories and combinations of demographic categories are also compatible with certain embodiments described herein.

For example, the user demographic profiles of the profiled users can be used to calculate the gender composition of random users visiting 20,000 websites (W00001 to W20000). As discussed above, the profiled users can include 160,000 users whose gender has been assigned (e.g., 100,000 assigned as male, 60,000 assigned as female) based on their web browsing of gender-skewed websites. If 40,000 of these gender-profiled users visited website W00001, with 10,000 male-profiled users and 30,000 female-profiled users, then the website profile of website W00001 can be calculated to be 25% male and 75% female. Similar calculations can be made for other demographic categories to calculate the website profiles of the predetermined group of websites.

In another example, the number of visiting profiled users and the time spent by the profiled users can be used to determine the website profile. A dataset for visits to an example website "aaroads.com" over a two-month period indicates that the website was visited by: 56 Caucasian users for a total time of 21340 seconds; 10 African-American users for a total time of 3449 seconds; 9 Hispanic users for a total time of 2830 seconds; 2 Asian users for a total time of 634 seconds; and 1 other user for a total time of 104 seconds. The proportion of time spent by each ethnicity subgroup and the proportion of visitors in each ethnicity subgroup can be calculated (e.g., Caucasians are 72% of the visitors and spent 75% of the total time; African-Americans are 13% of the visitors and spent 12% of the total time; Hispanics are 11% of the visitors and spent 10% of the total time; Asians are 3% of the visitors and spent 2% of the total time; and others are 1% of the visitors and spent close to 0% of the total time). An average of proportions based on both the number of visitors and the total time spent can be used to calculate the distribution of ethnicity subgroups on the website to be: 0.735 Caucasian; 0.125 African-American; 0.105 Hispanic; 0.025 Asian; and 0.01 other. These proportions can be compared to the overall distribution of ethnicities on the Internet to identify the relative skewness of the website for ethnicity. For example, if the distribution of ethnicities on the Internet is approximately 70% Caucasian, 12% African-American, 12% Hispanic, 4% Asian, and 2% other, then the website aaroads.com does not appear to be highly skewed towards one ethnicity, but is oriented towards the Caucasian and African-American ethnicity subgroups since the proportion of visitors and time spent are higher for these subgroups than for the Internet population.

In certain embodiments, while the non-Caucasian ethnicity subgroups have dedicated websites which can be used to identify members of these subgroups, Caucasians do not have a significant number of such websites. In certain such embodiments, another technique is used to identify Caucasian users. For example, an example set of profiled users contains the following: 3502 African-Americans, 3804 Hispanics, 1254 Asians, and 651 other, while the ethnic distribution of the Internet population is approximately 70% Caucasian, 12% African-American, 12% Hispanic, 4% Asian, and 2% other. To identify which subset of the set of profiled users represents their respective proportion optimally, the subsets are divided by their ethnic Internet proportions, and the minimum value is chosen to ascertain the bias of the set of profiled users against the overall Internet distribution. For example, such a calculation applied to the example set yields 3502/12=292 for African-Americans, 3804/12=317 for Hispanics, 1254/4=314 for Asians, and 651/2=326 for others. This calculation yields the lowest value for African-Americans, so the number of African-Americans in the example set of profiled users is taken to be closest to the Internet distribution, and an unbiased distribution based on the set of profiled users is calculated to be: 292*70=20428 Caucasians, 292*12=3502 African-Americans, 292*12=3502 Hispanics, 292*4=1167 Asians, and 292*2=584 other. In certain embodiments, a set of ethnicity-profiled users can be compared to such a calculated unbiased distribution and weights can be calculated. For example, in this example set, the weight of Hispanics is 3502/3804=0.921, the weight of Asians is 1167/1254=0.931, and the weight of others is 584/651=0.897. In certain embodiments, these weights can be used as coefficients in the calculations of the total time spent and the number of visitors described above.

In certain embodiments, the traffic of the advertisement network to which advertisements are provided may not be representative of the entire Internet demographic distribution. In certain such embodiments, significantly more users belonging to a particular demographic group can be identified. For example, if the proportion of users is significantly skewed towards a few demographic groups, the threshold for assigning an anonymous user to a particular demographic group can be adjusted proportionately so that a fair proportion of users are classified into each possible demographic group while still achieving accurate profiling. In certain embodiments, this adjustment can be done by identifying the most under-represented demographic group. For that group, the number of users X in that group exceeding a fixed threshold are assigned that demographic group. Based on the number X, the number of members Y assigned to the remaining demographic group can be calculated and used as a customized threshold for each demographic group.

FIG. 15 shows the estimated distribution of various demographic subgroups for various example websites as compared to the expected distribution on the Internet. Each of the example websites listed in FIG. 15 are skewed to some level as compared to the demographic profile of a random Internet user. For example, the website "en.wikipedia.com" is skewed towards male users and the website "fantasysports.yahoo.com" is skewed towards users with an annual income of $60-75K. In certain embodiments, the level of skewness of a given website with regard to a given demographic subgroup can be expressed as the ratio of the probability that a random user visiting the website is a member of the demographic subgroup and the probability that a random user on the Internet is a member of the demographic subgroup. For example, using this calculation for skewness, the skewness of the website "en.wikipedia.com" towards males is about (70.42/49.42)=1.42 and the skewness of the website "fantasysports.yahoo.com" towards users with an annual income of $60-75K is about (34.41/12.20)=2.82. Other measures of skewness are also compatible with certain embodiments described herein.

In certain embodiments, one or more of the demographic categories (e.g., annual income) may not significantly influence the behavior of users browsing the Internet, so it is possible that there may not be a sufficient number of websites skewed towards one or more subgroups of these demographic categories. In certain such embodiments, use of the web traversal histories can be supplemented by other information (e.g., web search terms used by the user, obtained from the cookies file) to assign the user to a particular subgroup. In certain embodiments in which a website having a skewed profile has low traffic or where the number of visitors to the website in a particular subgroup is low, each subgroup can be approached separately and the calculation for each combination of subgroups can be isolated from other subgroups to advantageously avoid misrepresentations of data. A user's interest in particular categories of websites can demonstrate, indicate, or imply whether the user belongs to a particular demographic group. For example, a user who is interested in automotive and sports category websites would be highly likely to be a male. Similarly, interest in automotive, business, and travel could demonstrate, indicate, or imply that the user is in a higher income segment. From the ISP data, certain embodiments first identify the categorical interests of users. Correlating the user's demographic attributes with their categories of strong interest using classification approaches (e.g., Association Rules and CART (Classification & Regression Trees)), certain demographic attributes of a user can be identified.

FIG. 16A shows an example daily website profile file 520 in accordance with certain embodiments described herein. Each line of the daily website profile file 520 contains a field identifying the website ("WebsiteName"), a field identifying an hour of the day ("Daypart"), and a plurality of fields corresponding to various demographic subgroups. Each demographic subgroup field includes data corresponding to the number of profiled users visiting the website during the identified hour of the day that are members of the corresponding demographic subgroup. In certain embodiments, the website profile file 520 includes data regarding 20,000 websites and has a size of about 23 MB with about 20,000*24=480,000 lines. In certain embodiments, the name of the daily website profile file 520 contains an indication of the day to which the file corresponds.

The example daily website profile file 520 of FIG. 16A comprises a series of lines for the website "geocities.com" for a particular day. The Daypart field has a value of "1" to "24", where "1" corresponds to 00:00 am to 00:59 am (the first hour of the day), "2" corresponds to 01:00 am to 01:59 am (the second hour of the day), and so forth. The fields "MaleAge1" through "MaleAge7" indicate the number of profiled users visiting "geocities.com" during the hour of the day indicated by the Daypart field who were male and in AgeGroup1 through AgeGroup7. The fields "FemaleAge1" through "FemaleAge7" indicate the number of profiled users visiting "geocities.com" during the hour of the day indicated by the Daypart field who were female and in AgeGroup1 through AgeGroup7. While these fields are shown in FIG. 16A to be in two separate lines for each website and hour of the day, in certain embodiments, each website and hour of the day is represented by a single line. In certain embodiments, the fields within the website profile file 520 are populated by scanning the "clean" sorted daily web traversal history file 442 to obtain a list of the websites visited by at least one profiled user and to tally which users visited these websites and at what hour of day this visit occurred. For example, if a user profiled to be a male in AgeGroup1 has visited a particular website during a particular hour of the day, the field of the website profile file 520 corresponding to the website, hour of day, and MaleAge1 is incremented by one, and scanning the "clean" sorted daily web traversal history file 442 continues.

In certain embodiments, an aggregate website profile file 530 is created for each day of the week. The name of each aggregate website profile file 530 can include an indication of the day of the week (e.g., 0 to 6 corresponding to Monday through Sunday). Each of the seven aggregate website profile files 530 contains the aggregate data for visits by the profiled users to the various websites for the corresponding day of the week. For example, for a predetermined period (e.g., one month or 28 days), the aggregate website profile file for Monday comprises the aggregated data for all Mondays of the corresponding predetermined period. FIG. 16B shows an aggregate website profile file 530 for all Mondays during the period of November 1st to December 25th.

In certain embodiments, a daily website forecast file is created for each day of the week. The fields of the daily website forecast file include the WebsiteName, the Day (e.g., Monday=1, Sunday=7), CountMaleAge1 through CountMaleAge7, PercentMaleAge1 through PercentMaleAge7, CountFemaleAge1 through CountFemaleAge7, PercentFemaleAge1 through PercentFemaleAge7, WeightMaleAge1 through WeightMaleAge7, and WeightFemaleAge1 through WeightFemaleAge7. For each website, there are seven lines in the daily website forecast file (one for each Day). The CountMaleAgeN and CountFemaleAgeN fields (where N denotes the age groups 1 through 7) are obtained directly from the seven aggregate website profile files 530. The PercentMaleAgeN and PercentFemaleAgeN fields are calculated by dividing the corresponding "Count" field by the total number of counts in the "Count" fields. The "Percent" fields represent the probability that a random user visiting the website on the corresponding day is in the corresponding gender and age group subgroup corresponding to the "Percent" field. These fields can be used to determine the probabilities that a random user visiting the website on a particular day of the week is male, female, and/or in a selected one of the age groups. In certain embodiments, the weight fields are derived from the percentage fields. In certain such embodiments, the weight fields can be omitted. In certain embodiments, other fields corresponding to other demographic categories can also be provided.

In certain embodiments, an hourly website forecast file is created for each day of the week and for each hour of the day. The fields of the hourly website forecast file include the WebsiteName, the Day (e.g., Monday=1, Sunday=7), the DayPart (e.g., hour of the day, indicated by 1 through 24), CountMaleAge1 through CountMaleAge7, PercentMaleAge1 through PercentMaleAge7, CountFemaleAge1 through CountFemaleAge7, PercentFemaleAge1 through PercentFemaleAge7, WeightMaleAge1 through WeightMaleAge7, and WeightFemaleAge1 through WeightFemaleAge7. For each website, there are 7*24=168 lines in the hourly website forecast file. The "Percent" fields represent the probability that a random user visiting the website on the corresponding day and hour of day is in the corresponding gender and age group subgroup corresponding to the "Percent" field. These fields can be used to determine the probabilities that a random user visiting the website on a particular day of the week and hour of day is male, female, and/or in a selected one of the age groups. In certain embodiments, other fields corresponding to other demographic categories can also be provided.

For example, the daily website forecast file for the hypothetical website "rentdvd.com" could include data indicative of the following demographic profile of visitors to the website on a Monday:

Gender: Male: 32%; Female: 68%.
Age: 0-17: 0%; 18-24: 12%; 25-35: 64%; 36-50: 22%; 51-65: 2%; 65+: 0%.
Annual Income: $0-25K: 2%; $25-50K: 11%; $50-75K: 46%; $75-100K: 21%; $100-150K: 11%; $150K+: 9%.
Ethnicity: Caucasian: 34%; African American: 44%; Asian: 17%; Hispanic: 3%.
Household Size: 1 Person: 7%; 2 People: 16%; 3-4 People: 37%; 5+ People: 40%.
Education Level Some High School: 4%; High School Degree: 12%; Some College: 16%; Associates Degree: 8%; Bachelors Degree: 36%; Graduate Degree: 12%; Other: 12%.

In certain other embodiments, the website can be profiled in other demographic categories as well.

In certain embodiments, the daily website forecast file or the hourly website forecast file can be used to characterize a target audience of advertisements for the website. The target audience of advertisements for the website can be defined to be members of demographic subgroups with percentages in the website forecast file that are greater than a predetermined threshold. For example, for the rentdvd.com example above, using a predetermined threshold of 35%, the target audience of advertisements for the rentdvd.com website can be defined to be female, age between 25 and 35, annual income of $50-75K, caucasian or african american, household size of more than 3 people, and having a bachelors degree. Each of these demographic subgroups had a percentage in the example website forecast file cited above larger than the 35% threshold. In other words, users in demographic subgroups with percentages larger than the threshold can be considered users who like to use the rentdvd.com website, and the owners of the rentdvd.com website would be interested in placing advertisements where such users would view their advertisement. The website forecast files can also be used to characterize various websites at various portions of the day to determine where and when members of the target audience are visiting other websites to determine where and when to place advertisements (e.g., the advertisements of rentdvd.com).

In certain embodiments, the information in the website forecast files can be expressed as a website composition vector 600. FIG. 17A shows an example website composition vector 600 in accordance with certain embodiments described herein. Each element of the website composition vector 600 corresponds to the fraction of users visiting the website that are in the various subgroups of the gender and age group demographic categories. In certain other embodiments, the website composition vector 600 can contain elements corresponding to subgroups or combinations of subgroups of other demographic categories.

In certain embodiments, the website composition vectors 600 of various websites are grouped together in a website composition file having a plurality of lines, and each line having a plurality of fields. FIG. 17B shows a listing 610 of the fields of each line of an example website composition file in accordance with certain embodiments described herein. Besides the SiteID and SiteName fields, each line comprises a plurality of numerical fields corresponding to the fraction of users visiting the website being members of the corresponding subgroups. The website composition file of certain embodiments has one line per website (e.g., 1500 lines), with each data line providing the website composition vector 600 of the website.

FIG. 17C shows a listing 620 of the fields of an example daily website composition file in accordance with certain embodiments described herein. Each line of the daily website composition file has a field denoting the day of the week (e.g., Monday through Sunday) and the numerical fields correspond to the percentage or fraction of users visiting the website during the particular day of the week being members of the corresponding subgroups. The daily website composition file of certain embodiments has seven lines per website (e.g., 1500*7=10500 lines), with each data line providing the website composition vector 600 of the website corresponding to the particular day of the week.

FIG. 17D shows a portion of an example daily website composition file 622 in accordance with certain embodiments described herein. In certain embodiments, the daily website composition file 622 is in CSV format, in which the first line is a header line and the subsequent lines are data lines. The numerical fields of the daily website composition file 622 shown in FIG. 16D have two digits after the decimal point, although in certain other embodiments, more digits (e.g., six or more) after the decimal point are used.

FIG. 17E shows a listing 630 of the fields of an example hourly website composition file in accordance with certain embodiments described herein. Each line of the hourly website composition file has a field denoting the day of the week and a field denoting the hour of the day (e.g., 1-24) and the numerical fields correspond to the fraction of users visiting the website during the particular day of the week and the hour of the day being members of the corresponding subgroup. The hourly website composition file of certain embodiments has 7*24=168 lines per website (e.g., 168*1500=about 240,000 lines), with each data line providing the website composition vector 600 of the website corresponding to the particular day of the week and hour of the day.

User Probability Vectors

In certain embodiments, the web browsing histories of the plurality of anonymous users can be expressed in a user history file 650 having one line per anonymous user. FIG. 18 shows a portion of an example user history file 650 in accordance with certain embodiments described herein. Each line of the user history file 650 contains a UserID field, a DateCreated field, a DateUpdated field, and one or more SiteID/Count fields. The SiteID portion of the SiteID/Count field denotes a website visited by the anonymous user and the Count portion of the SiteID/Count field denotes the number of times the anonymous user visited the website as listed in the sorted total log data file 254. In certain embodiments, each line in the user history file 650 will have an indefinite number of SiteID/Count fields.

In certain embodiments, the probabilities that a particular anonymous user is in the various subgroups of the demographic categories can be expressed as a user probability vector 700. FIG. 19A shows an example user probability vector 700 in accordance with certain embodiments described herein. The user probability vector 700 shown in FIG. 19A has 14 fields corresponding to the probabilities that the particular anonymous user is a member of the corresponding gender and age group subgroups. In certain other embodiments, the user probability vector 700 can contain elements corresponding to subgroups or combinations of subgroups of other demographic categories.

In certain embodiments, the user probability vectors 700 of millions of anonymous users can be represented in one or more user probability tables 710. FIG. 19B shows a listing 720 of the fields of an example user probability table 710 in accordance with certain embodiments described herein. FIG. 19C shows a portion of an example user probability table 710 in accordance with certain embodiments described herein. The UserID field of certain embodiments contains the user identification data (e.g., as stored in the cookies file on the anonymous user's computer 10). The DateCreated field of certain embodiments contains the data on which the user probability vector 700 for UserID was first created. The LastUpdated field of certain embodiments contains the date on which the user probability vector 700 for UserID was updated most recently. The nSites field of certain embodiments contains the total number of profiled websites visited by the UserID. For example, the nSites field can contain the number of clicks in the sorted total log data file 254 corresponding to visits by the UserID to profiled websites. Besides the UserID, DateCreated, LastUpdated, and nSites fields, each line comprises a plurality of numerical fields corresponding to the probabilities that the anonymous user is a member of the corresponding subgroups.

The user probability table 710 of certain embodiments has one line per anonymous user, with the probability data lines providing the user probability vector 700 of the anonymous user. In certain embodiments, the demographic profiles of millions (e.g., 50 million, 120 million, or more than 120 million) anonymous users are calculated, so the one or more user probability tables 710 contain 120 million or more lines of data, with each line having about 200 bytes of data (including space used for indexes). Therefore, in certain embodiments, the one or more user probability tables 710 have a total size of about 24 GB.

In certain embodiments, the user probability vectors 700 are partitioned among 120 user probability tables 710 with each user probability table 710 containing the user probability vectors 700 for about one million anonymous users. In certain such embodiments, MySql tables work well when the number of lines or rows is below one million, and the size of the table is below 1 GB. Various schemes for partitioning the user probability vectors 700 among the user probability tables 710 are compatible with certain embodiments described herein. In certain embodiments, hashing by prime numbers is used to create partitions with little variance in size among the various user probability tables 710. For example, an alphanumeric key can be used as a number of base 36 with 0=0, . . . , 9=9, A=10, B=11, . . . , Z=35. The number N can be evaluated and the group number defined to be (N mod 2999) mod 120. In certain embodiments, rather than evaluating the number N (which can result in overflow), a shortcut formula can be used to derive (N mod 2999) which uses less than 20 integer multiplications. In certain embodiments, the user probability vectors 700 are sorted while being merged into the user probability table 710, thereby improving performance by reducing processing time.

Estimated User Demographic Profile

In certain embodiments, the first record of visits by the anonymous user (e.g., as expressed by the sorted total log data file 254 or by the user history file 650) and the website profile comprising demographic characteristics of each website 20 of the predetermined group of websites visited by an anonymous user (e.g., as expressed by the website composition vectors 600 in the website composition file, daily website composition file, or hourly website composition file) are used to calculate an estimated user demographic profile. In certain embodiments, this estimated user demographic profile is expressed as a user probability vector 700. For example, in certain embodiments, the daily website composition file is loaded into memory into a Java hash, and the sorted total log data file 254 is also read into memory. For each anonymous user, the corresponding lines of the sorted total log data file 254 are read, and the lines of the daily website composition file corresponding to the websites visited by the anonymous user are read.

In certain embodiments, upon detecting that a website visited by the anonymous user in the sorted total log data file 254 is not a profiled website (e.g., the website does not have a website composition vector 600 in one of the website composition files), the lines of the sorted total log data file 254 corresponding to that website are ignored, and the identity of the website is recorded in a listing of websites not yet profiled. In certain such embodiments, this listing of websites not yet profiled has five fields: UserID (identifying the anonymous user who visited the website), SiteID (identifying the website), Clicks (number of visits by the anonymous user to the website), and TimeStamp (date and time of the latest visit by the anonymous user to the website). In certain embodiments, a maximum number (e.g., 100) of lines corresponding to a given website are kept in the listing, even if there are many more (e.g., thousands) of such lines in the sorted total log data file 254. In certain embodiments, this listing of the websites not yet profiled can be used to identify websites to be profiled for subsequent calculations.

In certain embodiments, the estimated user demographic profile for an anonymous user who has visited each of k profiled websites (e.g., $W_1, W_2, \ldots, W_k$) a number of times (e.g., $n_1, n_2, \ldots, n_k$) respectively, and the k profiled websites have k corresponding website composition vectors (e.g., $S_1, S_2, \ldots, S_k$) is calculated using the following equation:

$$\text{User Probability Vector} = \sum_i S_i n_i \Big/ \sum_i n_i. \quad (3)$$

In this way, certain embodiments described herein calculate the estimated user demographic profile of an anonymous user to be a weighted average of the website composition vectors of the websites visited by the anonymous user.

In certain embodiments, outlier visits by the anonymous user can be ignored to produce a modified weighted average. For example, if a user has historically visited websites that are skewed towards a particular ethnicity (e.g., Caucasian), then a random visit to a website significantly skewed towards another ethnicity (e.g., Asian) can be ignored or its weight in the average can be reduced.

In certain embodiments, the website composition vectors 600 corresponding to the demographics of random users during a particular day of the week are used in conjunction with the entries of the sorted total log data file 254 corresponding to visits by the anonymous user during the particular day of the week. In certain other embodiments, the website composition vectors 600 corresponding to the demographics of random users during a particular day of the week and hour of the day are used in conjunction with the entries of the sorted total log data file 254 corresponding to visits by the anonymous user during the particular day of the week and the particular hour of the day. In this way, certain embodiments advantageously utilize the detailed data obtained regarding the website composition vectors 600 which reflect changes of the website composition vector 600 for various days of the week and various hours of the day.

In certain embodiments, the estimated user demographic profiles for the anonymous users are calculated at predetermined intervals (e.g., once every 12 hours, once every 24 hours) and the estimated user demographic profiles are expressed as user probability vectors 700 in a user probability table 710 corresponding to the web browsing of the anonymous users during the most recent interval (e.g., during the previous day). In certain embodiments, previously-calculated estimated user demographic profiles are updated to reflect the web browsing of the anonymous user since the previous calculation. In certain such embodiments, the estimated user demographic profile for an anonymous user is updated using the following equation:

$$UPV_{updated} = (UPV_{Previous})*(nSites_{Previous}) + (UPV_{New})* (nSites_{New}), \quad (4)$$

where $UPV_{Previous}$ is the previously-existing user probability vector 710, $nSites_{Previous}$ is the cumulative number of visited websites used in calculating $UPV_{Previous}$, $UPV_{New}$ is the newly-calculated user probability vector corresponding to the web browsing of the anonymous users during the most recent interval, and $nSites_{New}$ is the number of visited websites used in calculating $UPV_{New}$. $UPV_{New}$ is calculated to be equal to $$\sum_i S_i n_i \Big/ \sum_i n_i$$

for the web browsing during the most recent interval. Both $UPV_{Previous}$ and $nSites_{Previous}$ are obtained from a previous user probability table 710, and $UPV_{New}$ and $nSites_{New}$ are obtained from the most recent user probability table corresponding to the web browsing of the anonymous users during the most recent interval. In certain embodiments, the $nSites_{Previous}$ and $nSites_{New}$ values are each normalized to the sum of ($nSites_{Previous} + nSites_{New}$). In certain embodiments, the website composition vectors $S_k$ of the k profiled websites in Equation (4) have values which have been updated since a previous determination of the website composition vectors $S_k$. The number of times $n_k$ in Equation (4) correspond to the number of times that the anonymous user has visited the profiled websites during the most recent interval. Thus, in certain embodiments, the previous user probability vectors 700 are used as an input in a subsequent calculation of the updated user probability vectors 700.

In certain embodiments, the updated estimated user demographic profiles are recorded in an updated user probability table, wherein each line of the updated user probability table has a UserID field, a DateCreated field, a LastUpdated field, a nSites field, and a plurality of fields corresponding to the updated user probability vector 700 having probabilities that the anonymous user identified by UserID is a member of the various subgroups of the demographic categories. In certain embodiments, user probability vectors 700 which have not been updated for more than a predetermined period of time (e.g., 60 days) are deleted from the user probability table 710 and are not included in the updated user probability table.

For example, in certain embodiments, the previously-existing user probability table containing the $UPV_{Previous}$ data is compared with a table comprising the newly-calculated $UPV_{New}$ data corresponding to the web browsing of the anonymous users during the most recent interval. If a UserID is present in only one of the two tables, then the line for that UserID is copied into the updated user probability table. If both files have the same UserID, then the line in the updated user probability table will have the weighted average of the $UPV_{Previous}$ and the $UPV_{New}$, where the weight is given by the number of websites used in calculating the respective user probability vectors ($nSites_{Previous}$ and $nSites_{New}$, respectively). If the LastUpdate field is older than the predetermined period of time (e.g., 60 days), then the line for that UserID is not copied into the updated user probability table. In this way, certain embodiments described herein have an updated user probability table containing the weighted average of the demographic profiles of the websites visited by the UserID since the user identification data was last installed on the user's computer.

In certain embodiments, the user probability table is a large file (e.g., about 6000 MB in size) and is stored in local storage. In certain such embodiments, storing the user probability table in a local storage drive advantageously reduces the time of transferring the file between a remote server and the local storage drive, which can represent a savings of about 2 hours of processing time. In certain such embodiments, upon a crash of the local storage drive, the data can be re-obtained by running the analysis again on the sorted total log data files 254 corresponding to a predetermined number of past days (e.g., a few days or a week). In certain other embodiments, the user probability table is copied onto the remote server at the end of the process. Upon starting the calculation of an updated user probability table, the filesize of the previous user probability table on the remote server is compared with the filesize of the copy on the local drive. If the filesizes are equal, the copy on the local drive will be considered to be the most recent version, and no copying of the previous user probability table is performed. If the filesizes are unequal, then the copy on the local drive will be considered to be stale, and the copy from the remote server will be copied onto the local drive, and this copy will be used for the subsequent calculations.

In certain embodiments, a user demographic table 730 is created based on the data contained in the user probability table. FIG. 20A shows a portion of an example user demographic table 730 in accordance with certain embodiments described herein. The user demographic table 730 of certain embodiments contains one line per UserID and one demographic field ("DemoDetail") containing data regarding the demographic profile of the anonymous user identified by UserID. In certain embodiments, the DemoDetail field contains a 22-byte string, which is based on the probabilities that the anonymous user is in the various subgroups of the demographic categories as listed in the user probability table.

For example, in certain embodiments, a predetermined number of demographic groups ("DemoGroup") are defined, and the Nth byte of the DemoDetail field provides information regarding whether the anonymous user is a member of the corresponding DemoGroup. In certain embodiments, the Nth byte is set to "1" if the anonymous user is a member of the Nth DemoGroup, as determined by the probabilities for the anonymous user in the user probability table. FIG. 20B shows one example set 732 of demographic groups in accordance with certain embodiments described herein. For example, if the probability that the anonymous user is a member of AgeGroup1 (e.g., the sum of MaleAgeGroup1 and FemaleAgeGroup1) is greater than 0.25, then the fourth byte of the DemoDetail field will be 1, otherwise the fourth byte will be 0. As another example, if the probability that the anonymous user is a member of either AgeGroup2 or AgeGroup3 (e.g., the sum of MaleAgeGroup2, FemaleAgeGroup2, MaleAgeGroup3, and FemaleAgeGroup3) is greater than 0.4, then the fourteenth byte of the DemoDetail field will be 1, otherwise the fourteenth byte will be 0. Other defined demographic groups corresponding to other subgroups or combinations of subgroups of these or other demographic categories are also compatible with certain embodiments described herein.

In certain embodiments, the number of anonymous users which were profiled as male, profiled as female, and with unknown gender can be tabulated. Similarly, the number of anonymous users profiled to be in the subgroups of the age group demographic category, or in the subgroups of other demographic categories can also be tabulated. These tabulations can be used for analytical reporting and monitoring of the system operation.

In certain embodiments, as the number of different websites visited by the anonymous user increases and the frequency of the visits increases, the demographic estimates for the anonymous user will have an increasing level of confidence. In addition, the demographic skewness of the websites visited by the anonymous user will impact the level of confidence in the demographic estimates. For example, visits to a demographically neutral website will not significantly assist the estimation of the anonymous user's demographic profile.

In certain embodiments, the demographic profiles of the anonymous users are used by a plurality of advertisement servers to select and provide advertisements and/or other information to be viewed by the particular anonymous users based on their user probability vectors 700. In certain such embodiments, the UserIDs and the corresponding data from the user demographic table 730 are listed in a server assignment file corresponding to the advertisement server of the plurality of advertisement servers which provides advertisements viewed by the anonymous user on a set of member, client, or partner websites. For example, for 16 advertisement servers, the UserIDs of the anonymous users are distributed among 16 server assignment files. Upon the advertisement server receiving a signal (e.g., from the website) indicating that the anonymous user is visiting a website, the advertisement server identifies the user probability vector 700 of the anonymous user, selects an advertisement based on the user probability vector 700, and transmits the selected advertisement to the anonymous user's computer to be viewed by the anonymous user.

In certain embodiments, the advertisements presented to an anonymous user via the websites that the user is visiting are tailored to appeal to users having the estimated demographic profile of the anonymous user. For example, if the anonymous user is estimated to be female, advertisements tailored to appeal to females are presented to the anonymous user. In certain embodiments, the advertisements presented to the anonymous user via the websites that the user is visiting are selected to target users having the estimated demographic profile of the anonymous user. For example, if the anonymous user is estimated to be female, advertisements which seek to target females are presented to the anonymous user.

In certain embodiments, various combinations of the subgroups of the demographic categories can be used to target specific audiences. For example, using gender (2 subgroups), age group (5 subgroups), annual income (5 subgroups), education (4 subgroups), ethnicity (5 subgroups), number of children (3 subgroups), and occupation (6 subgroups) as the demographic categories, there are 25,200 possible combinations of the subgroups that can be targeted. Using many demographic categories in certain embodiments is fairly restrictive, so in certain other embodiments, fewer demographic categories (e.g., two to four of the seven demographic categories listed above) are used to target audiences.

In certain embodiments, the demographic profile of an anonymous user is specific to the day of the week and/or hour of the day in which the anonymous user's computer is being used to access websites. For example, the demographic profile of an anonymous user can be different for evening hours as compared to daytime hours. Certain such embodiments advantageously allow the demographic profile to account for different family members using the user's computer at different times of the day and/or different days of the week.

In certain embodiments, the demographic profiles of the anonymous users visiting a particular website are tabulated to monitor the number of times an advertisement has been viewed by anonymous users having the desired demographic profile. For example, if an entity desires that an advertisement be viewed by one million users having the profile of "males between 18 to 24 years of age" over the next 60 days, the advertisement can be presented to anonymous users visiting one or more websites, and the profiles of the anonymous users actually viewing the advertisement can be recorded. Thus, the entity can be sure that the desired number of users having the selected profile have viewed the advertisement.

Various embodiments have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A method of determining a demographic category of users in a web environment that includes a client computer and a server computer comprising:
receiving, from a web site, via the server computer across a network, demographic information about a first user, wherein the first user is a member of the website;
receiving a record of websites visited by the first user based on a monitoring and recording of a web browsing history of the first user; and
utilizing the demographic information about the first user to calculate the demographic category of other users that have visited one or more of the websites in the record of websites.

2. The method of claim 1, wherein, the demographic information is voluntarily submitted to the web site by the user as part of a registration procedure.

3. The method of claim 1, further comprising:
presenting advertisements to the other users based on the calculated demographic category.

4. The method of claim 3, further comprising:
determining whether a desired number of the other users that are within the calculated demographic category have viewed the advertisements.

5. The method of claim 1, further comprising:
determining a probability that the other users are in the calculated demographic category.

6. The method of claim 1, wherein the demographic information comprises a gender of the first user.

7. The method of claim 1, wherein the demographic information comprises an age of the first user.

8. A system for determining a demographic category of users in a web environment that includes a client computer and a server computer comprising:
a client computer having a memory;
an application executing on the client computer, wherein the application is configured to:
receive, from a website, via the server computer across a network, demographic information about a first user, wherein the first user is a member of the website;
receive a record of websites visited by the first user based on a monitoring and recording of a web browsing history of the first user; and
utilize the demographic information about the first user to calculate the demographic category of other users that have visited one or more of the websites in the record of websites.

9. The system of claim 8, wherein, the demographic information is voluntarily submitted to the website by the user as part of a registration procedure.

10. The system of claim 8, wherein the application is further configured to:
present advertisements to the other users based on the calculated demographic category.

11. The system of claim 10, wherein the application is further configured to:
determine whether a desired number of the other users that are within the calculated demographic category have viewed the advertisements.

12. The system of claim 8, wherein the application is further configured to:
determine a probability that the other users are in the calculated demographic category.

13. The system of claim 8, wherein the demographic information comprises a gender of the first user.

14. The system of claim 8, wherein the demographic information comprises an age of the first user.

15. A non-transient computer readable medium encoded with computer program instructions executable by a computer to perform method steps for determining a demographic category of users in a web environment that includes a client computer and a server computer, wherein the method steps comprise:
receiving, from a web site, via the server computer across a network, demographic information about a first user, wherein the first user is a member of the website;
receiving a record of websites visited by the first user based on a monitoring and recording of a web browsing history of the first user; and
utilizing the demographic information about the first user to calculate the demographic category of other users that have visited one or more of the websites in the record of websites.

16. The non-transient computer readable medium of claim 15, wherein, the demographic information is voluntarily submitted to the website by the user as part of a registration procedure.

17. The non-transient computer readable medium of claim 15, wherein the method steps further comprise:
presenting advertisements to the other users based on the calculated demographic category.

18. The non-transient computer readable medium of claim 17, wherein the method steps further comprise:
determining whether a desired number of the other users that are within the calculated demographic category have viewed the advertisements.

19. The non-transient computer readable medium of claim 15, wherein the method steps further comprise:
determining a probability that the other users are in the calculated demographic category.

20. The non-transient computer readable medium of claim 15, wherein the demographic information comprises a gender of the first user.

21. The non-transient computer readable medium of claim 15, wherein the demographic information comprises an age of the first user.

* * * * *